US007835896B1

(12) United States Patent
Rode

(10) Patent No.: US 7,835,896 B1
(45) Date of Patent: Nov. 16, 2010

(54) APPARATUS FOR EVALUATING AND DEMONSTRATING ELECTRONIC CIRCUITS AND COMPONENTS

(75) Inventor: Christian Stig Rode, Waltham, MA (US)

(73) Assignee: Rode Consulting, Inc., Waltham, MA (US)

( * ) Notice: Subject to any disclaimer, the term of this patent is extended or adjusted under 35 U.S.C. 154(b) by 0 days.

(21) Appl. No.: 09/287,478

(22) Filed: Apr. 6, 1999

Related U.S. Application Data

(60) Provisional application No. 60/080,905, filed on Apr. 6, 1998.

(51) Int. Cl.
*G06F 17/50* (2006.01)

(52) U.S. Cl. .............................. 703/14; 703/17; 716/1; 716/16; 709/232

(58) Field of Classification Search .................. 703/14, 703/17; 716/4, 16, 19, 1; 707/8, 10; 709/106, 709/302, 232, 203; 700/97
See application file for complete search history.

(56) References Cited

U.S. PATENT DOCUMENTS

| | | | |
|---|---|---|---|
| 5,278,770 A | | 1/1994 | Gore et al. |
| 5,615,367 A * | | 3/1997 | Bennett et al. .............. 707/102 |
| 5,757,925 A | | 5/1998 | Faybishenko |
| 5,778,368 A * | | 7/1998 | Hogan et al. .................. 707/10 |
| 5,812,130 A * | | 9/1998 | Van Huben et al. ........... 345/10 |
| 5,815,683 A | | 9/1998 | Vogler |
| 5,907,621 A | | 5/1999 | Bachman et al. |
| 5,950,201 A * | | 9/1999 | Van Huben et al. .......... 707/10 |
| 5,966,707 A * | | 10/1999 | Van Huben et al. .......... 707/10 |
| 5,983,277 A * | | 11/1999 | Heile et al. ................. 709/232 |
| 6,002,871 A * | | 12/1999 | Duggan et al. .............. 395/704 |
| 6,005,568 A * | | 12/1999 | Simonoff et al. ............ 345/335 |
| 6,014,647 A * | | 1/2000 | Nizzari et al. ................ 705/39 |
| 6,035,300 A * | | 3/2000 | Cason et al. ................ 707/102 |
| 6,094,654 A * | | 7/2000 | Van Huben et al. ............ 707/8 |
| 6,101,489 A * | | 8/2000 | Lannert et al. ................ 706/45 |
| 6,118,938 A * | | 9/2000 | Lawman et al. ............... 716/16 |
| 6,134,592 A * | | 10/2000 | Montulli ..................... 709/229 |
| 6,170,014 B1 * | | 1/2001 | Darago et al. ............... 709/229 |
| 6,272,518 B1 * | | 8/2001 | Blazo et al. ................. 709/102 |
| 6,292,766 B1 | | 9/2001 | Mattos et al. |
| 6,324,672 B1 * | | 11/2001 | Lawman et al. ................ 716/1 |
| 6,353,898 B1 * | | 3/2002 | Wipfel et al. ................. 714/48 |

(Continued)

OTHER PUBLICATIONS

Answer Record #7436: LogiCORE PCI—Error: "XPCI CORE Generator Server transaction failed. Failure cause: 1097 . . . ". Xilinx 2005 [retrieved on Oct. 19, 2005]. Retrieved from the Internet: <URL: http://www.xilinx.com/xlnx/xil_ans_display.jsp?getPagePath=7436>.

(Continued)

*Primary Examiner*—Thai Phan

(57) ABSTRACT

A new system for simulation of electrical circuits and devices over a network is disclosed. The system consists of at least a client computer, a server computer, a network that connects them (including intermediate proxy servers and routers) and software methods. New software methods are disclosed that combine client-submitted data from the internet with template data, simulate the combined data using a simulator such as SPICE and create display and other data for transport to and display on the client computer. Additional methods are disclosed relating to circuit synthesis prior to simulation, access control, limiting resource use and abuse, expiration of temporary files and identifiers and usage logging.

16 Claims, 25 Drawing Sheets

U.S. PATENT DOCUMENTS

| | | | |
|---|---|---|---|
| 6,397,117 B1* | 5/2002 | Burrows et al. | 700/97 |
| 6,401,114 B1* | 6/2002 | Jenkins | 709/219 |
| 6,530,065 B1 | 3/2003 | McDonald et al. | |
| 6,574,628 B1* | 6/2003 | Kahn et al. | 707/10 |
| 6,578,188 B1* | 6/2003 | Pang et al. | 716/19 |
| 6,658,464 B2* | 12/2003 | Reisman | 709/219 |
| 2002/0174263 A1* | 11/2002 | Codd et al. | 709/318 |
| 2002/0198966 A1* | 12/2002 | Jenkins | |

OTHER PUBLICATIONS

CORE Generator for PCI: The First Web-Based Development Tool for FPGA Design. Xilinx, Inc. 1997 [retrieved on Oct. 19, 2005]. Retrieved from the Internet: <URL: http://www.xilinx.com/xcell/xl25/xl25_14.pdf>.

CORE Generator Questions & Answers. Xilinx, Inc. 1997 [retrieved on Oct. 19, 2005]. Retrieved from the Internet: <URL: http://www.xilinx.com/products/logicore/pci/cg_qa.htm>.

Email from Mark Noble, Xilinx Technical Support. Xilinx, Inc. Oct. 19, 2005.

"Why Choose a Monolithic Instrumentation Amplifier". EDTN / Rode Consutling, 1999. [retrieved on Oct. 19, 2005] Note Xilinx sponsorship.

Solaimalai and Hicks, "Techniques for Embedding Circuit Simulations into Electronics Design Courseware", International Conf. on Engineering Ed., Aug. 6-10, 2001, Oslo, Norway.

Regnier and Wilamowski, "SPICE Simulation and Analysis through Internet and Intranet Networks", IEEE Circuits and Devices Mag., May 1998, pp. 9-12, v14i3, IEEE, USA.

Lorenz, et al, "Towards a Web-Based Simulation Environment", Proc. of the 1997 Winter Simulation Conference (Atlanta, Dec. 7-10, 1997), p. 1340-1343.

Hicks, P.J., et al, "A Computer-Based Teaching System for Electronic Design Education: EDEC", The Int. Journal of Engineering Education, 1997, p. 70, v13n1, UK, TEMPUS.

Fishwick, Paul A., "Web-based Simulation: Some Personal Observations", Proc. of the 1996 Winter Simulation Conference (Coronado, CA, Dec. 8-11, 1996), p. 1-8.

* cited by examiner

Minimal simulation configuration (0)  Client user has logged in and obtained a session ID, if necessary
(1)  Form data (HTML or Java)
(2)  Form submission (CGI GET or POST)
(3)  (simulation)
(4)  Results (HTML+GIF, JPG, PNG, etc. or PDF or Java, etc.)

APPARATUS FOR EVALUATING AND DEMONSTRATING ELECTRONIC CIRCUITS AND COMPONENTS

CROSS REFERENCE TO RELATED APPLICATIONS (Provisional Application Filing: 60/080,905 Filing date: Apr. 6, 1998)

STATEMENT REGARDING FEDERALLY SPONSORED RESEARCH OR DEVELOPMENT

Not Applicable

REFERENCE TO A MICROFICHE APPENDIX

A source code listing consisting of 1 microfiche and a total of 94 frames is attached.

BACKGROUND OF THE INVENTION

1. Field of the Invention

This invention relates to the field of computer networks and more specifically to the fields of computer networks and computer simulation.

2. Description of Prior Art

Computer programs for simulation of linear and nonlinear models have long been used to predict or evaluate the behavior of physical systems and components. These programs have also been used to educate students about linear and nonlinear system design. And these programs have previously been used in conjunction with networks (including the Internet) by means of remote terminals or display servers such as X Window.

The use of simulation programs by means of terminals or display servers has typically required a "logon account" and associated password to be created and administered for each user desiring to use the simulation software. Alternatively, guest accounts can be created for which all users share a common storage area and privileges. Both of these methods have limited applicability to public networks, such as the Internet, because 1. Individual logon accounts require time and expense to establish and maintain.
2. Individual logon accounts are not anonymous.
3. Anonymous accounts typically provide only a common storage area where one user's data are at the mercy of other users.
4. Logon accounts are inherently more difficult to make secure than access to a "web server".
5. The display of graphics typically requires the installation of a program such as an X Window server, with associated purchase, storage and maintenance costs.
6. Terminal and display server programs typically will not work across Firewalls without the installation of a special Proxy Server, with associated purchase, storage and maintenance costs.
7. Typical simulation programs do not log their usage.
8. The HTTP protocol and built-in functions of "web browsers" and "web servers" provide no support for resource management of a public CAD tool.

The following books/documents provide relevant background and are incorporated by reference:

"CGI Programming on the World Wide Web", Shishir Gundavaram, 1996 O'Reilly & Associates, Inc.

The CGI-HTTP mechanism is the handshake between a Browser client and a Web Server. This book contains an explanation of the "Common Gateway Interface" (CGI) mechanism, including "Hypertext Transfer Protocol" (HTTP) headers, the processing of client forms, server redirection, maintaining state by PATH_INFO, hidden fields and "cookies", etc. It includes examples in Perl, the language used in the microfiche code listing.

"The Essential Client/Server Survival Guide, Second Edition", Orfali, Harkey and Edwards, © 1996 John Wiley and Sons This is an introductory text on client/server computing and features a section (8) about implementing client/server over the world-wide web (chapters 27-31).

"Programming Perl", Larry Wall & Randal L Schwartz, © 1991 O'Reilly & Associates, Inc.

This is the official reference manual for the Perl programming language, the language principally used in the code listings.

"Java in a Nutshell, A Desktop Quick Reference for Java Programmers", David Flanagan, © 1996 O'Reilly & Associates, Inc.

An introductory text for the Java programming language, which is used in an auxiliary portion of the code listings, related to circuit synthesis before simulation.

"HTML: The Definitive Guide", Musciano & Kennedy, © 1996 O'Reilly & Associates, Inc.

An introductory text for HTML, the markup language used in the preferred embodiment for presentation of forms and simulation results (as detailed in the code listings). This book is more readable than the HTML specifications, listed below.

"JavaScript: The Definitive Guide, $2^{nd}$ edition", David Flanagan, © 1996-7 O'Reilly & Associates, Inc.

An introductory text that is more readable than the official Netscape JavaScript specs or the ECMAScript spec. In the preferred embodiment JavaScript is used to provide auxiliary functionality.

RFC 1945 (HTTP 1.0)/2048 (HTTP 1.1)/etc., IETF (Internet Engineering Task Force)

These are the W3C standards for Hypertext Transfer Protocol (HTTP) 1.0 and 1.1 http://www.w3.org/pub/WWW/Protocols/rfc1945/rfc1945 http://www.w3.org/pub/WWW/Protocols/rfc2068/rfc2068

RFC 1866 (HTML 2.0), IETF

This is the IETF standard for Hypertext Mark-up Language (HTML) 2.0 (now obsolete, however HTML3.2 is backward compatible with HTML 2.0) http://www.ictf.org/rfc/rfc1866.txt HTML 3.2, W3C (World-Wide Web Consortium)

The preferred embodiment presents form data and simulation results in HTML format. Below is the link to the W3C standard for HTML 3.2 http://www.w3.org/TR/REC-html32

U.S. Provisional Patent Application 60/080,905

As used in this document, the following words with capitalized first letters have special meanings:

A Computer includes any number and organization (cluster, array, etc.) of CPUs, memory/storage/communication devices, etc. and whose function includes the processing of data.

A Client is a Computer that is capable of accepting input from and providing output to an operator. A Client may also be a Server.

A Server is a Computer that provides computational, data storage, communication or other services for at least one (and usually more than one) Client. A Server may also be a Client.

A User is an individual or process that uses a Client. One Client can have multiple Users.

A Network includes all proxy servers, gateways, routers, communication channels, cabling, etc. that comprise a communication medium between two Computers, such as a private, local network or a public network such as the internet.

A Unique Identifier is a token (a collection of letters, digits and other symbols) that with high probability (>99%) is uniquely associated with a single User. For example, a uniformly-chosen 64-bit random number is considered a Unique Identifier for the purposes of this definition, because the probability is very small (<1%) that two users could be assigned the same number. A Unique Identifier does not necessarily contain or point to personal information about the user, i.e., an anonymous user can be assigned a Unique Identifier. A Browser is a Client program that at least a) accepts data in the form of a display list (e.g. HTML, XML) and b) wherein at least one of the interpretable display list elements is a "hyperlink" having the capability to "link" to display list data on Servers other than (and in addition to) that which provide the list containing the link. c) uses an intrinsically stateless, file-oriented protocol (e.g. HTTP) to retrieve objects named in the display list (e.g. GIF, JPG). Typical Browsers have many other capabilities in addition to these. The words "link" and "hyperlink" are standard terms of art within the field of HTML, HTTP and the WWW.

Form Structure Data are those elements of a fetched Browser display list (e.g. <FORM> tag and associated elements) that create corresponding form elements in which data can be entered and submitted to a Server (such submitted data is Form Data)

Form Structure Data are those elements of a fetched Browser display list (e.g. <FORM> tag and associated elements) that create corresponding form elements in which data can be entered and submitted to a Server (such submitted data is Form Data). Form Creation Data is any data used to create a user interface for data entry. Form Creation Data includes Form Structure Data as well as programmatic means of creating a user interface such as a Java applet (see FIG. 4-L). Data submitted to a Server from a form created by using Form Creation Data is also Form Data. A Stateless Communications Protocol is a protocol, such as HTTP, which is file-oriented and maintains no common state between contemporary or sequential transactions. Such a protocol is capable of transmitting state information (e.g., Netscape "Cookies"), but the protocol itself is inherently stateless. A Schematic is a structural or procedural diagram, especially of an electrical or mechanical system.

BRIEF SUMMARY OF THE INVENTION

The growing availability of HTTP-compatible software such as "web browsers" and Java™ makes desirable the use of the HTTP protocol as the basis for new simulation methods and apparatus.

It is therefore an object of the present invention to provide methods that enable 1) the serving of (optionally customized) Form Structure Data (in HTML, Java, etc.) to a Client, 2) the combination of Client-submitted data from said form with template or other data, 3) the processing of the combined data via a program such as SPICE and 4) the conversion and return of any processed output data to a client computer. Any and all of these steps will be referred to as simulation services.

It is another object of the present invention to provide methods that make simulation services available to an arbitrary number of simultaneous users by generating and using a Unique Identifier to keep user data separate and inhibit users from accessing each other's data.

It is yet another object of the present invention to provide methods that restrict the availability of simulation services by assigning verifiable (i.e., difficult to forge) Unique Identifiers. Such identifiers may be valid for only a limited time, in order to inhibit sharing, publishing, etc. of valid identifiers.

It is yet another object of the present invention to provide methods that limit use of simulation services to those submitted from a page created or retrieved from a particular server.

It is another object of the present invention to provide a plurality of output modes so as to be compatible with a variety of web browsers.

It is yet another object of the present invention to limit the computational resources used by any user on a per-simulation and per-time (such as day, week, month, etc.) basis.

It is yet another object of the present invention to log client submissions for marketing research, debugging, or other purposes. The log may use just the Unique Identifier and keep detailed client information in a separate file or database.

BRIEF DESCRIPTION OF THE DRAWINGS

FIG. 3-C High Performance Configuration (Method 3: Proxy service): Same hardware as in 3-A and 3-B, form data is submitted to web server which forwards the data to a simulation server and returns any output to client.

FIG. 4-B Sample User1 Interface: Select Circuit Topology (HTML input form)

FIG. 4-C Sample User Interface: Edit Component Values (HTML input form) FIG. 4-D Sample User Interface: Edit Additional Component Values (HTML input form) FIG. 4-E Sample User Interface: Simulation in Progress (HTML)

FIG. 4-F Sample User Interface: Simulation Results #1, Transient Output Plot (HTML+dynamically generated GIF plot)

FIG. 4-G Sample User Interface: Submit Simulation #2 (HTML input form)

FIG. 4-H Sample User Interface: Simulation Results #2, Frequency Output Plot (dynamically generated Adobe Acrobat PDF plot)

FIG. 4-I Sample User Interface: Submit Simulation #3 (HTML input form)

FIG. 4-J Sample User Interface: Simulation Results #3, Impedance Output Plot (dynamically generated Java plot)

FIG. 4-K Sample User Interface: Disabling individual traces in a Java Plot

FIG. 4-L Sample User Interface: Select Circuit Topology (Java input)

FIG. 5-B Sample User Interface: Calculator assistant for Java interface (Java input)

FIG. 6-B User Interface: Circuit Synthesis, Selecting synthesis function (Java input)

FIG. 6-C User Interface: Circuit Synthesis, Selecting Performance Targets (Java input)

FIG. 6-D User Interface: Circuit Synthesis, Synthesized Circuit Output/Edit Component Values (Java Output/Java Input)

FIG. 6-E User Interface: Circuit Synthesis, Simulation Output (dynamically generated GIF output, reduced) FIG. 6-F User Interface: Circuit Synthesis, Simulation Output (dynamically generated GIF output, 100%)

DETAILED DESCRIPTION OF THE PREFERRED EMBODIMENTS

Figure 1:
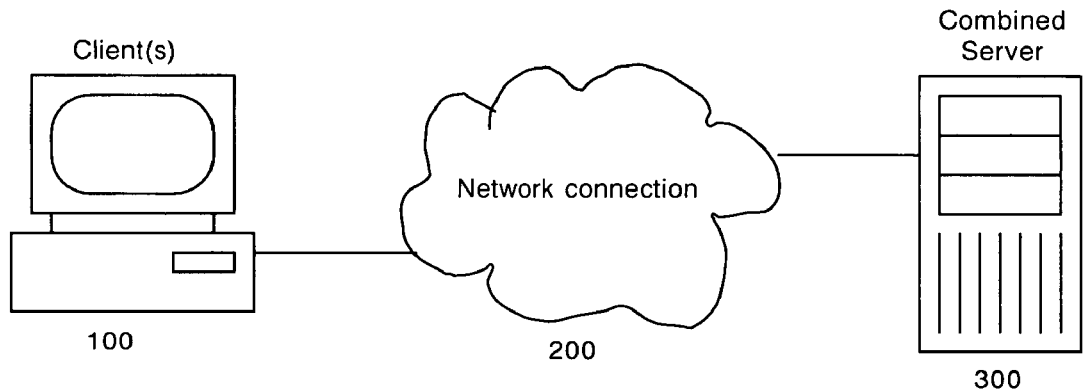
FIG. 1 A minimal system configuration consisting of 1 or more Clients, 1 combination web/simulation Server plus a Network.

The goal was to design a simple system capable of evaluating and comparing components and circuits (connected components) for the purposes of sales, marketing, educational and technical support, accessible world-wide. In all scenarios a primary advantage of the invention is to make such evaluations and comparison easier and faster, relative to the prior art. Previously, detailed component evaluation typically involved downloading and installing models and programs, with attendant risk and inconvenience to a (prospective) customer or student. The current invention also extends the advantages of a client-server implementation with respect to unburdening client computer resources (computational, storage, etc.) to anonymous users on the world-wide web (WWW)/public internet.

A secondary goal was to give unsupervised users access to simulation tools utilizing proprietary engineering data (for example, SPICE models) without giving access to the proprietary data itself. For example, the current state of the art is to distribute either 1) SPICE "macro" models (i.e. simplified models) of limited accuracy or 2) to distribute very detailed models (often under non-disclosure agreements) to customers who may be able to use the greater detail to discover proprietary design information. The current invention makes it possible to allow users to simulate real circuits with the most detailed models over the Internet while keeping some model data hidden.

The preferred embodiments use HTML or Java (or both) and HTTP/CGI to create public internet/WWW interfaces to the simulation tools. There are significant technological differences between a Browser CAD tool interface and client-server CAD implementations that have come before. These differences and the requirements of public access require additional innovations to accomplish the goal as set forth above.

Some of these differences include: 1) the need to synthesize a Unique Identifier to create user state, separate user data and manage user resource use 2) preventing or automatically detecting and compensating for abuse; limiting access; load management and reporting 3) usage logging for marketing or quality control purposes, 4) the variable capabilities and compatibilities of browsers.

1. Description

Three topologies and five distinct systems are illustrated in FIG. 1-FIG. 3C. All consist of Client(s), Server(s), a connecting network and new Server methods. The distinctions among them are the number and types of Servers and the methods used therein. In the preferred embodiments these methods are implemented as Apache Unix (Linux) CGI-scripts, predominantly written in Perl. Other languages and operating systems are contemplated, for example, Java servlets running within Microsoft's Internet Information Server. In all cases, the connection network (200) is undefined and may include an unknown number of proxy servers, gateways, routers, communications channels, cabling and the like. An example, however, would be the public Internet/WWW.

At least some of following known methods are distributed among the different kinds of Servers:

a) HTTP GET, POST, etc. and CGI methods (standard web server methods)

b) Methods for restricting access to a web site by a particular IP address, domain or sub-domain.

At least some of the following new methods are distributed among the different kinds of Servers:

a) A Unique Identifier assignment method.

b) An optional Unique Identifier validation method.

c) A form structure data generation method. This may include merging the Unique Identifier into a template form.

d) A form structure data and circuit synthesis method. A schematic with a corresponding component form is synthesized for user input and according to user specifications.

e) A method for merging submitted form data with other data in preparation for processing.

f) Processing merged data to produce output data compatible with a Browser. This is possibly divided into the sub-methods of creating temporary output data, then converting said data to a Browser-usable format.

g) Methods for limiting the number of simulations per Unique Identifier, per day (or other unit of time)

h) Methods for canceling simulations in progress in favor of new submissions submitted by the same user (as identified by the unique identifier)

i) Optional methods for gradually reducing the priority of successive jobs submitted by the same user.

2. Operation

In the preferred embodiments the Server methods are based on standard HTTP/CGI protocols and consequently many of the error or other unusual conditions handled by those protocols are not shown, only a typical transaction is illustrated.

Figure 2:
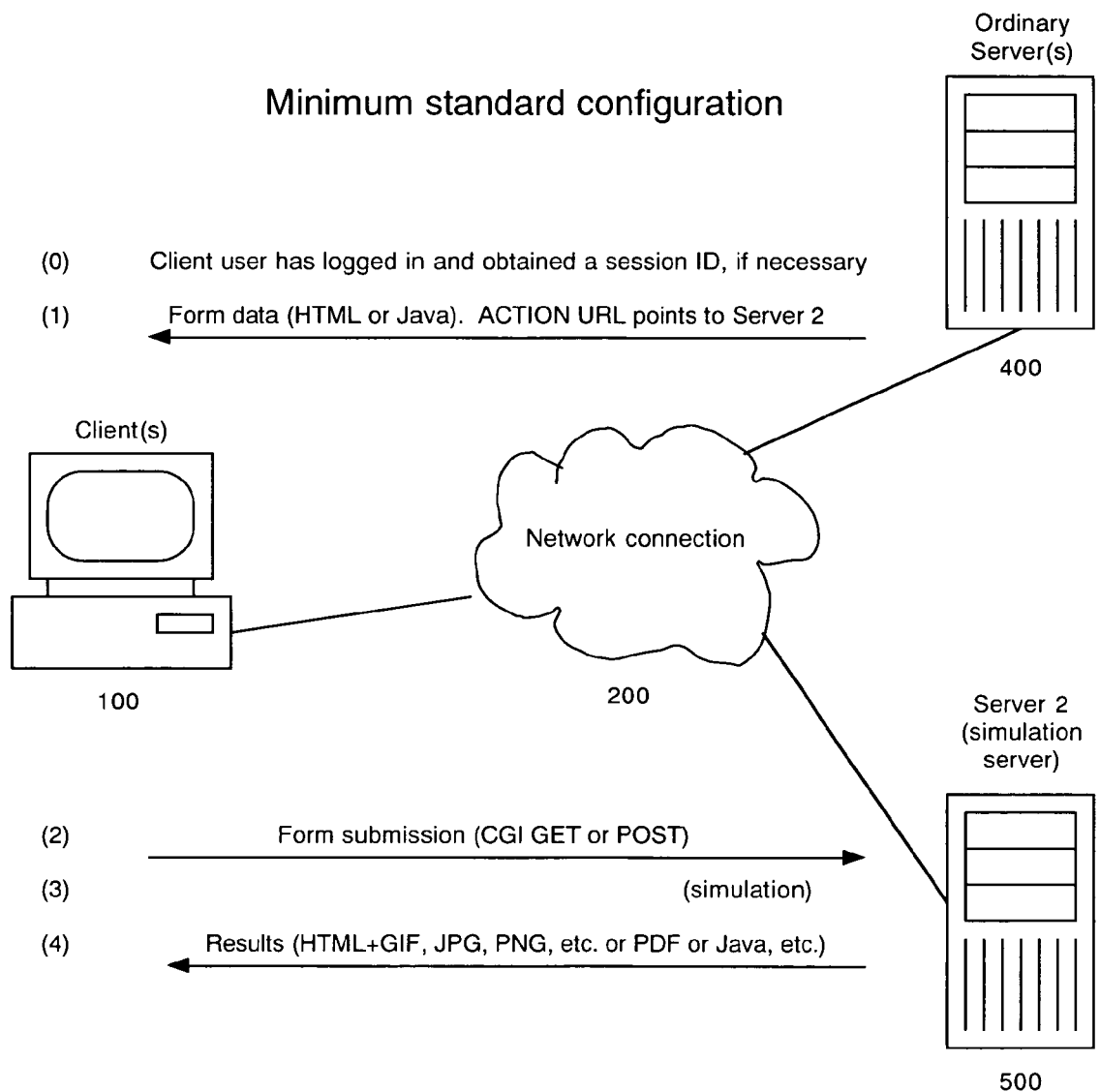
FIG. 2 Minimum Standard configuration: 1 or more Clients, 1 (or more) web Server(s), 1 simulation Server, plus Network Means FIG. 3-A High Performance Configuration (Method 1): 1 or more Clients, 1 (or more) web Server(s), more than 1 simulation Servers, plus Network Means. Simulation data submitted directly to simulation server.

In FIG. 2, the "minimum standard" Client-Server arrangement is shown: one or more Clients (100), one "standard" or "ordinary" web Server (400) and one web-based simulation Server (500). In this preferred embodiment both of these Servers have a web server, (e.g. Apache) running on each and new methods are implemented using CGI scripts. In this configuration, the Client requests HTML, image and other web data, including "form structure data" (data that comprises a list of form elements), from the standard web server, much as is the typical case for most servers on the WWW. Form structure data pertaining to simulation, however, is so constructed as to refer to the simulation Server. When the user submits data from these forms, the action is completed by the simulation Server, rather than the standard Server. This is done so as to unburden the standard Server of the computationally intense task of simulation.

In FIG. 1, the standard and simulation servers are combined into a single server, of lower cost and performance (300).

Figure 3A:
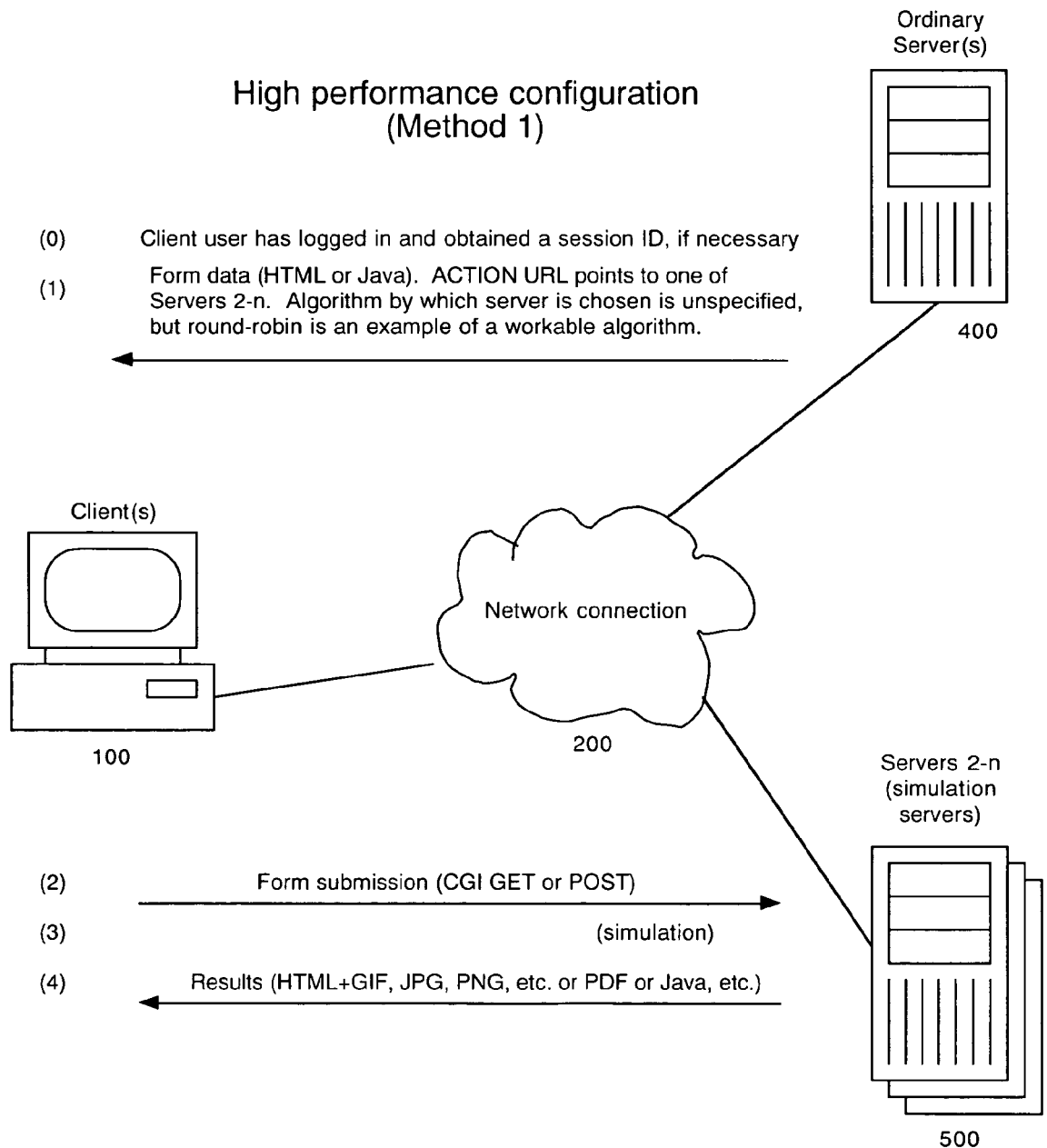
FIG. 3-B High Performance Configuration (Method 2): Same hardware as in 3-A, form data submitted to web server which forwards client to simulation server.

In FIG. 3A, a higher performance system is envisaged in which multiple simulation servers are available to provide a corresponding multiplication in the number of simultaneous simulations that can be processed. (The alternative of a single, multiple CPU server is considered to fall under either FIG. 1 or FIG. 2). In this case the simulation server is chosen ahead of time by the standard Server, by an unspecified algorithm, such as round-robin allocation. The server to be used is dynamically encoded in the form structure data that is sent to the client.

Figure 3B:
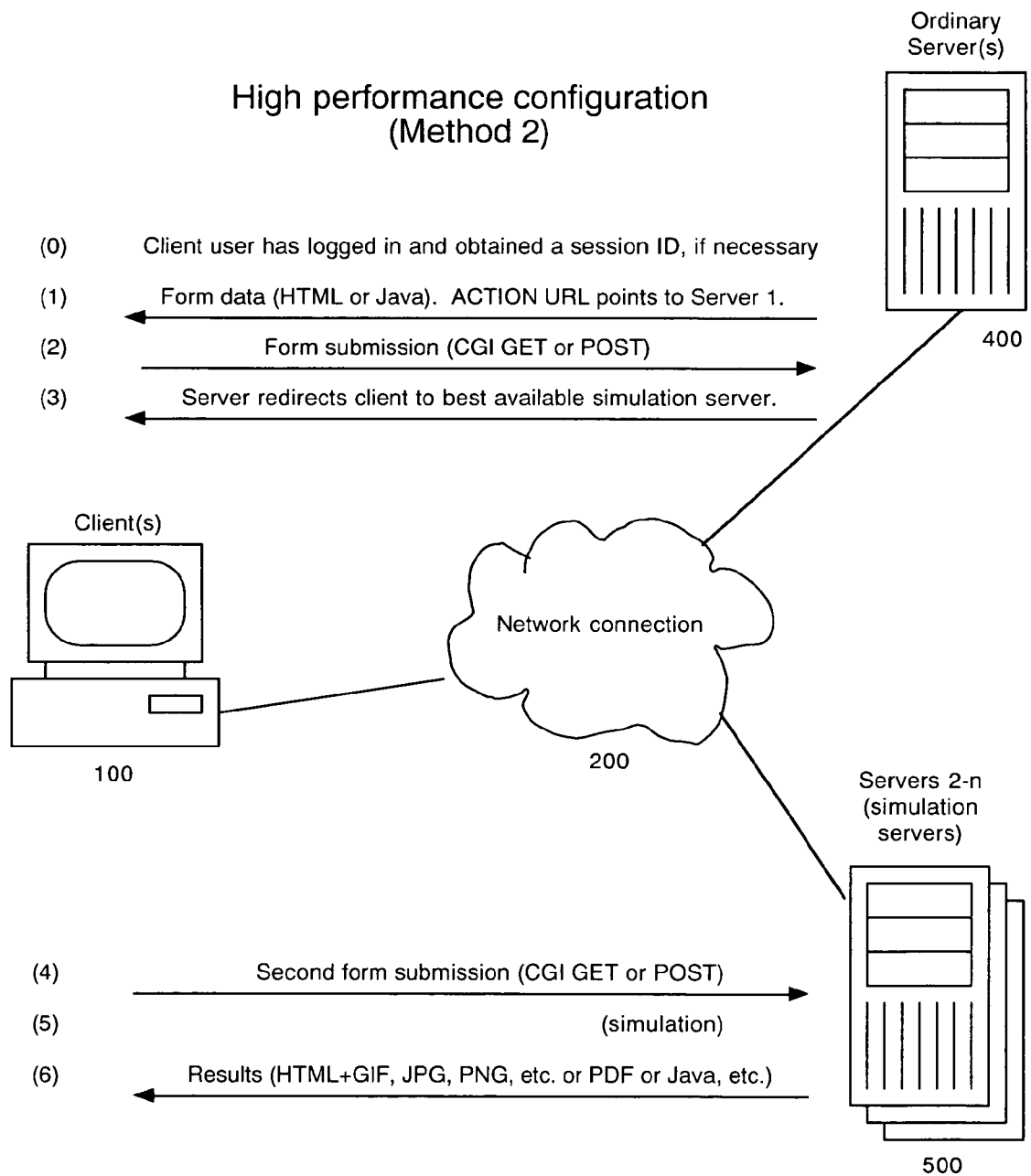

In FIG. 3B, a system similar to 3A is used except that the standard Server directs all simulation form submissions to itself then redirects those submissions (e.g. using the Location: directive) to one of the simulations Servers, by an unspecified algorithm.

Figure 3C:
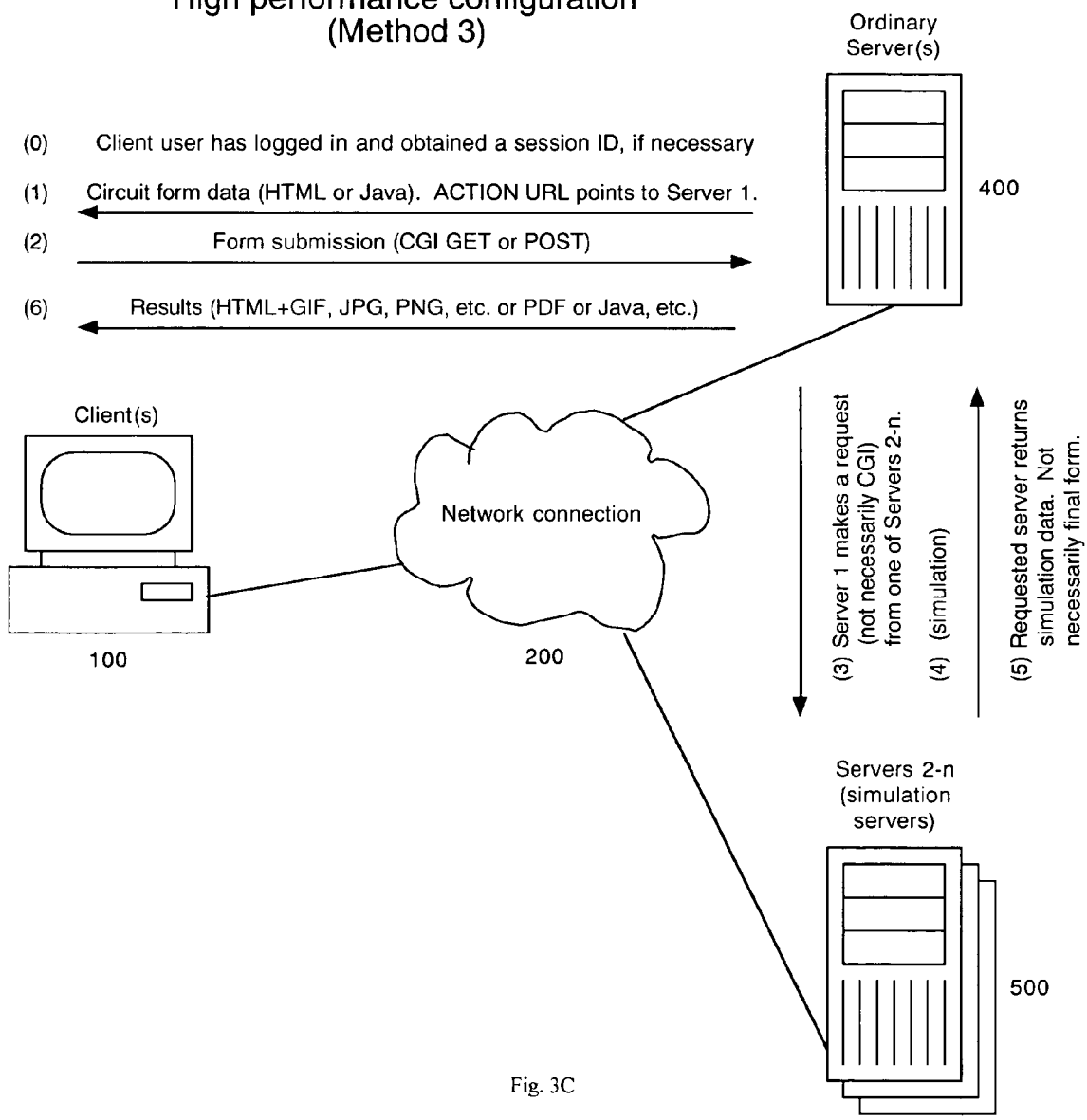

In FIG. 3C, a similar system to 3B is used except that the standard Server directs all simulation form submissions to itself and then makes a request of at least one of the simulation servers, the response(s) to which it returns to the Client. In this configuration it is not necessary for the communication between the standard Server and the simulation Server(s) to be HTTP/CGI and the standard Server is a kind of proxy server/gateway. Any high-performance protocol is sufficient since the Client interface is solely with the standard Server.

FIGS. 4A-L show a typical Client presentation, to be used in conjunction with FIG. 2 to explain a typical simulation session.

In generating a Unique ID, it is desirable to make the creation of the ID somewhat burdensome so that replacing exhausted IDs is non-trivial. This can be accomplished by means of a ID creation screen (as shown in 4A, a login screen) which may involve the entering of subscription data, taking a survey or simply filling out a make-work form. In the preferred embodiment the ID can be inserted into the URL so that it becomes part of PATH-INFO and preserved in a cookie (HTTP/CGI terms of art). The cookie/path-info mechanism are well known.

After the ID has been generated the user's Browser is forwarded to a simulation page. As shown here, the first CGI script executing is called "get" which treats everything after "get" in the URL as PATH-INFO. The first piece of the PATH-INFO is the number 891835080547, which in this particular case is the Unique ID. At time of creation, the Unique ID is also sent as a cookie, so that if the Browser is cookie-capable the ID will be remembered automatically when the user visits the page in 4A again and they will be forwarded automatically to this page. The rest of the path-info is used to fetch other web data, in this case a Perl script.

Figure 4A:
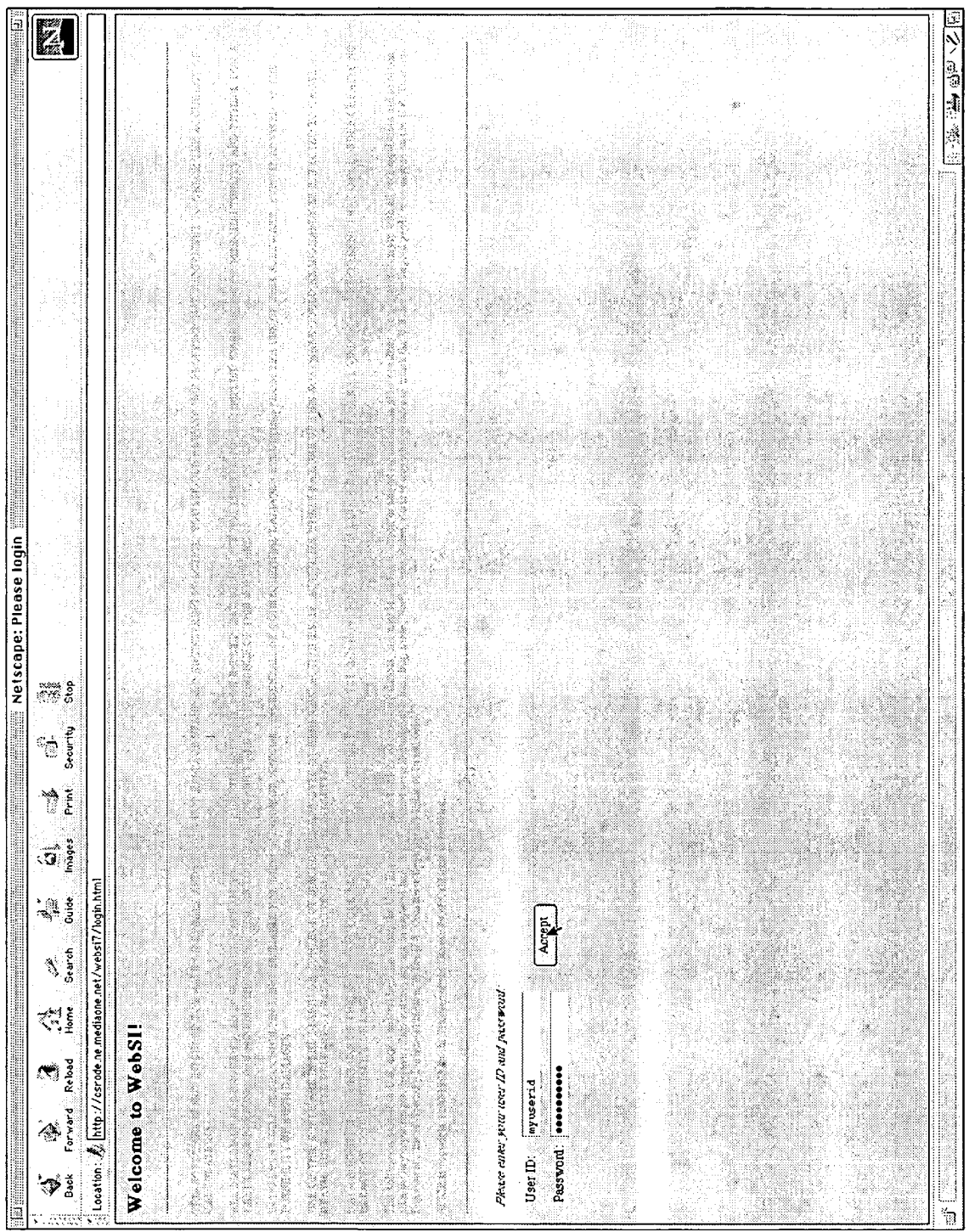
FIG. 4-A Sample User Interface: Example login (HTML input form)
Figure 4B:
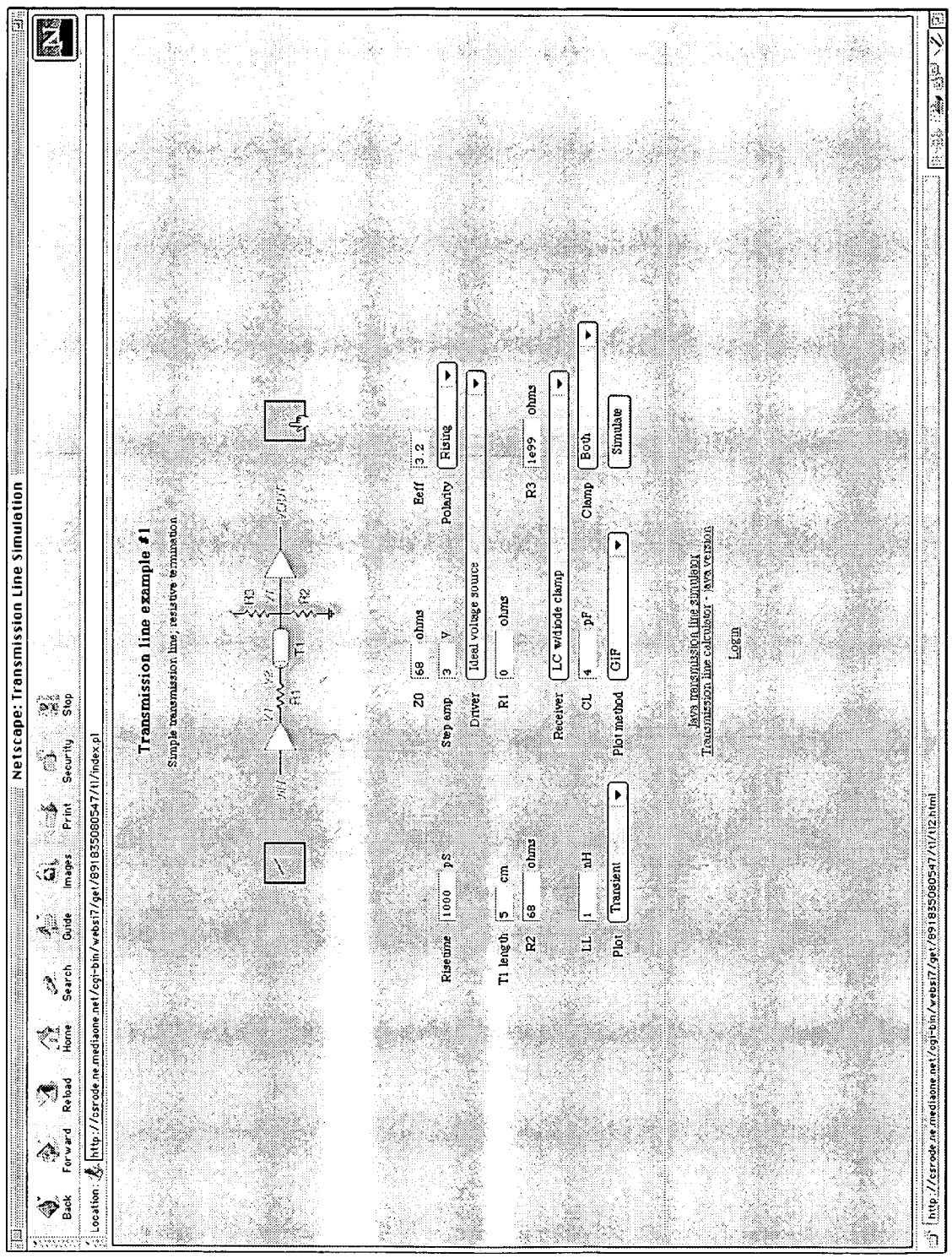
Figure 4C:
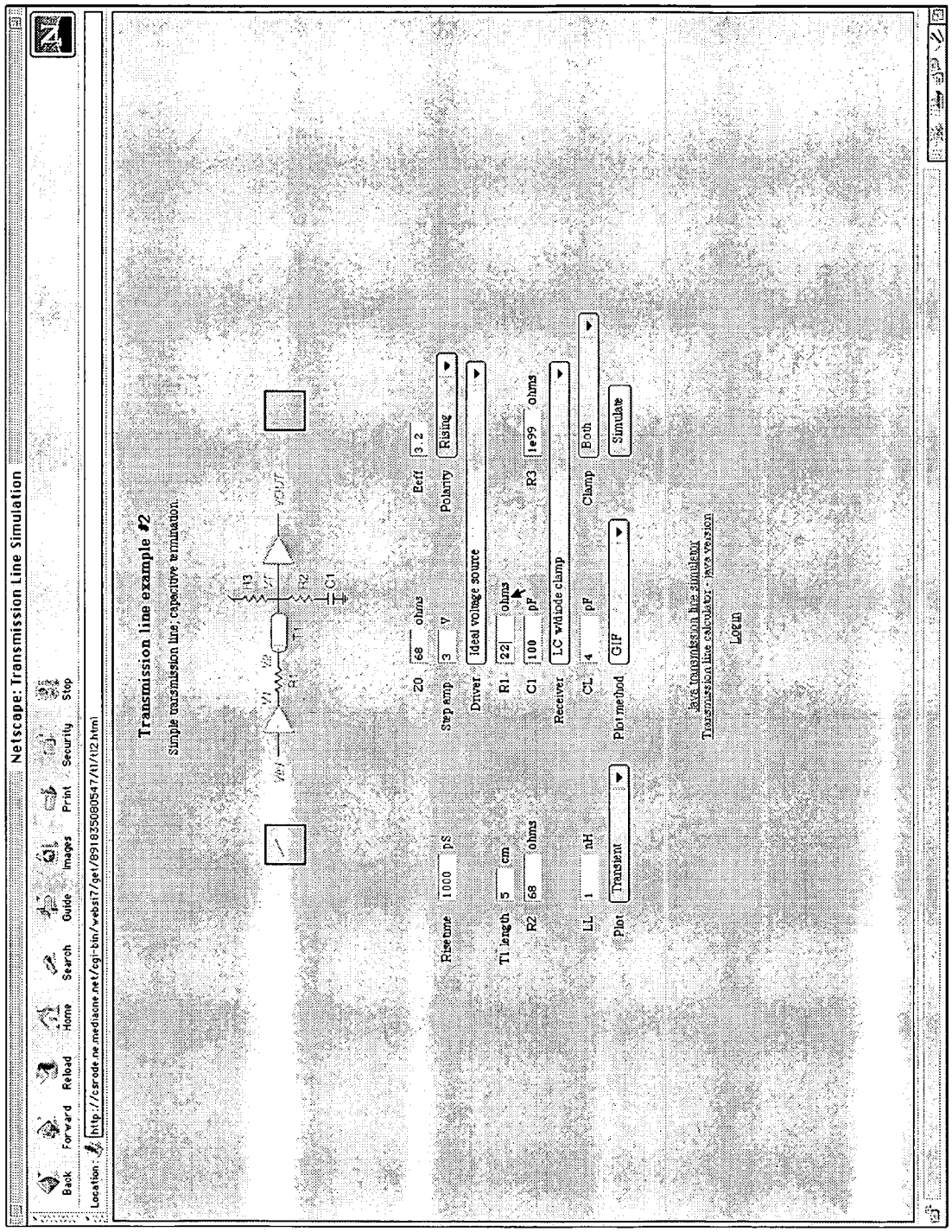
Figure 4D:
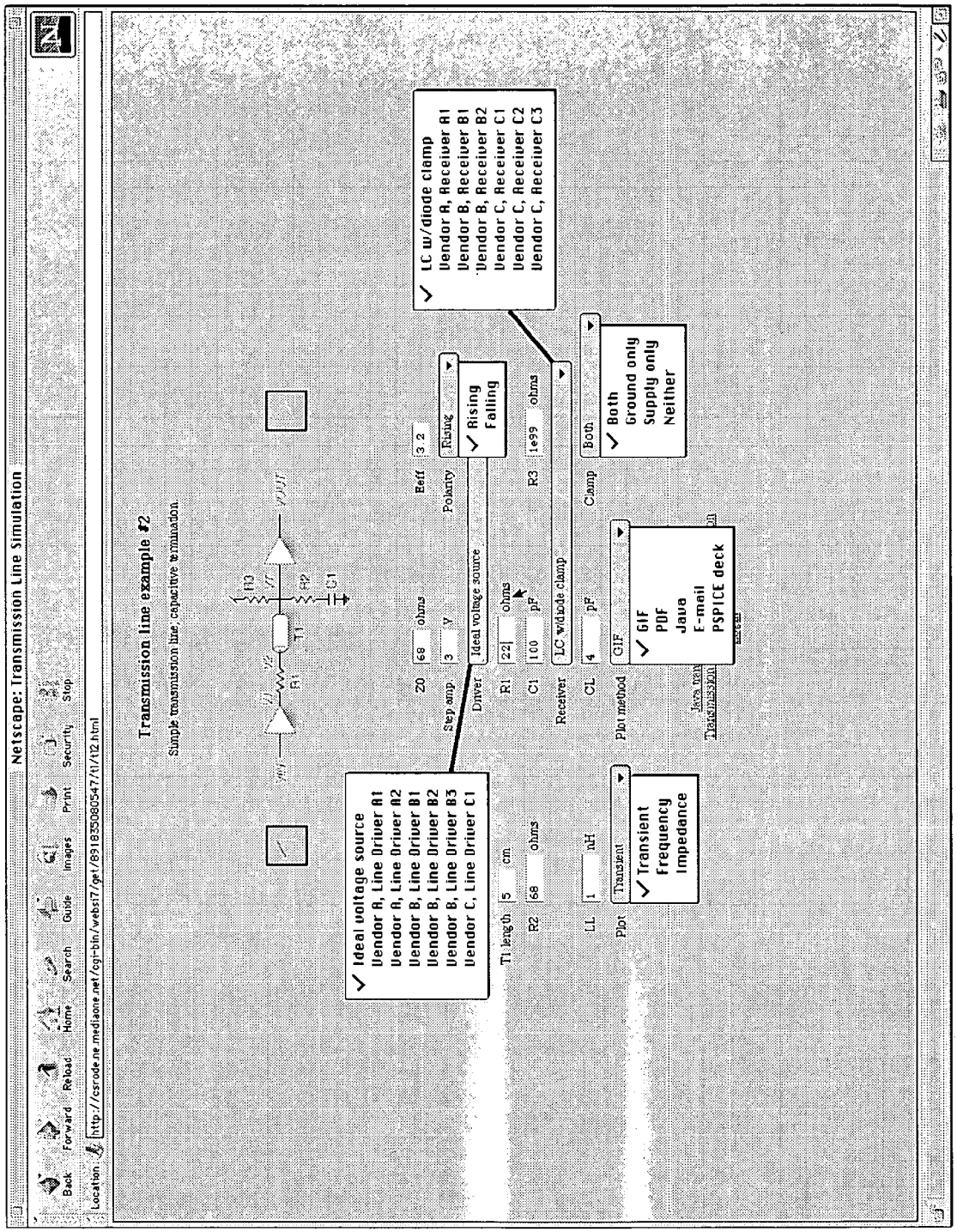
Figure 4E:
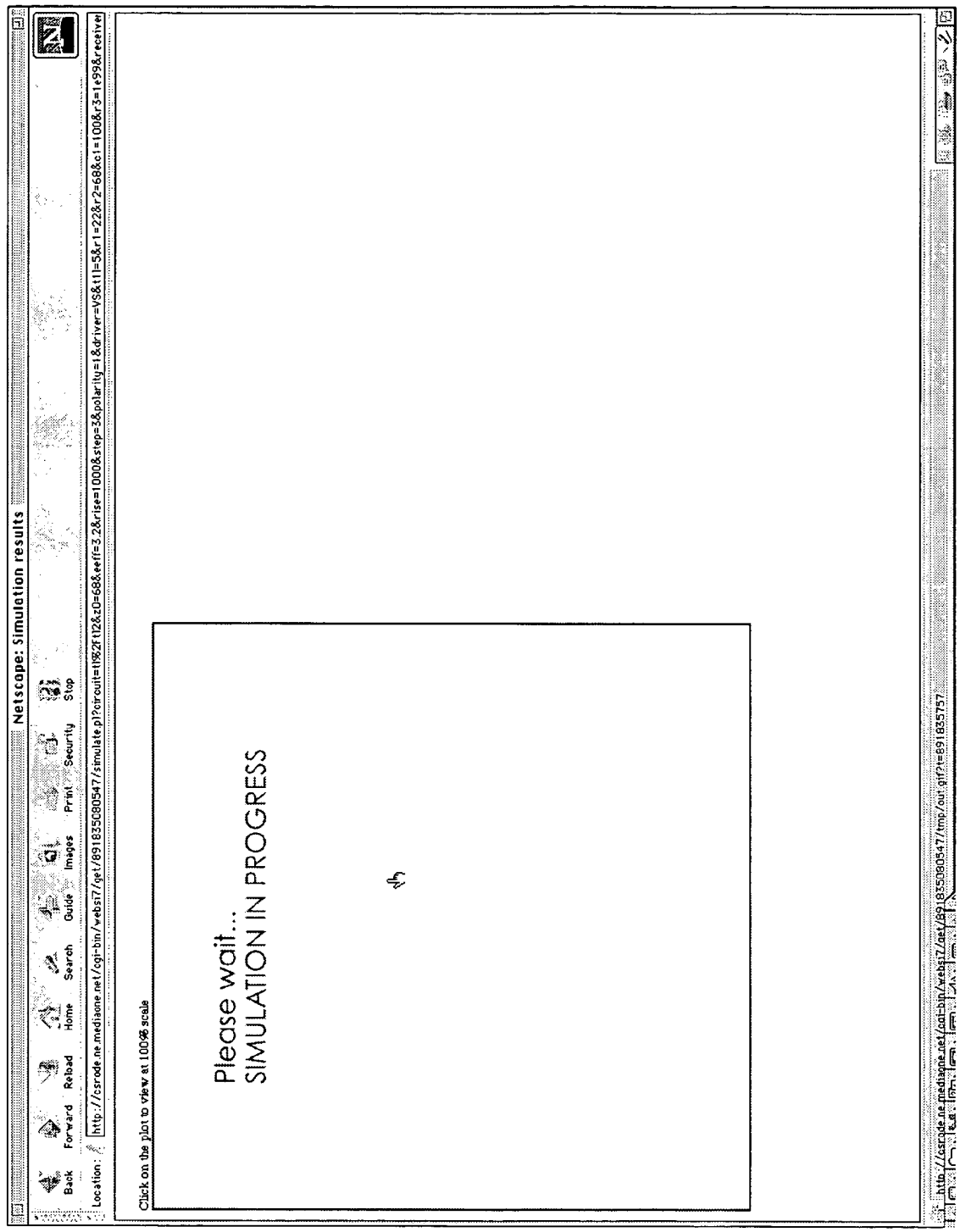

In FIG. 4C, the user has decided to select a different circuit to simulate and is entering data into a(n HTML) form element. FIG. 4D shows some of the other options possible in this form. In 4E they have clicked the "Simulate" form submission button and a new page has popped up with a temporary message (in Netscape browsers only) that says "Simulation in Progress". In the "FIG. 2" preferred embodiment, the clicking of the "Simulate" button sent form data directly to a simulation Server as designated in the ACTION field of the <FORM> tag. The following steps are performed at this time by the simulation server.

a) The Unique ID is retrieved and checked to make sure it is authentic. If not the user Browser is directed to an error page.

b) If authentic, the Unique ID is looked up in a database (in the source listing, this is simply a text file) to determine which account directory should be used. A simulation counter and timestamp are also retrieved and it is determined whether too many simulations have been run by this ID within the prescribed time. If too many have been run, the user Browser is directed to an error page.

c) A check is run to find existing processes running with this Unique Identifier. This may involve either a "process ID" temporary file or a search of a system process list or both. If any processes are found, they are aborted (killed).

d) The user-submitted form data is merged with a template file and the result is submitted to a simulation program such as SPICE. In some cases, the output data must be further converted to a standard format such as GIF or PDF before return. Several temporary files are typically created that use the Unique ID in their names to guarantee they don't conflict with the temporary files of other users. Part of the submitted form data determines the output format and thus the present invention includes multiple user-selected output modes for maximum Browser compatibility.

e) If the simulation is successful, the output data is returned to the user Browser (by using web server methods. If it is not successful an error page is shown.

Figure 4F:
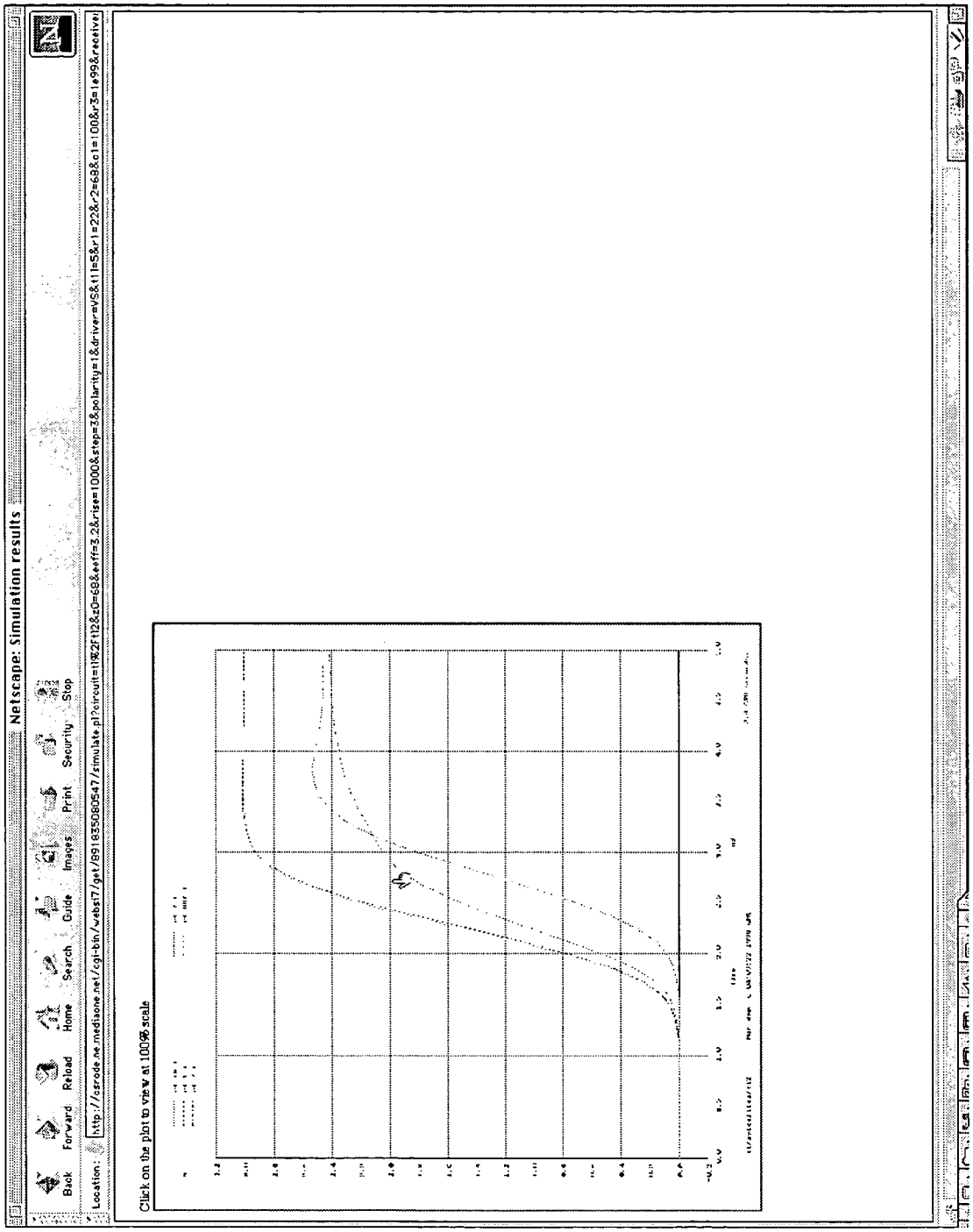
Figure 4G:
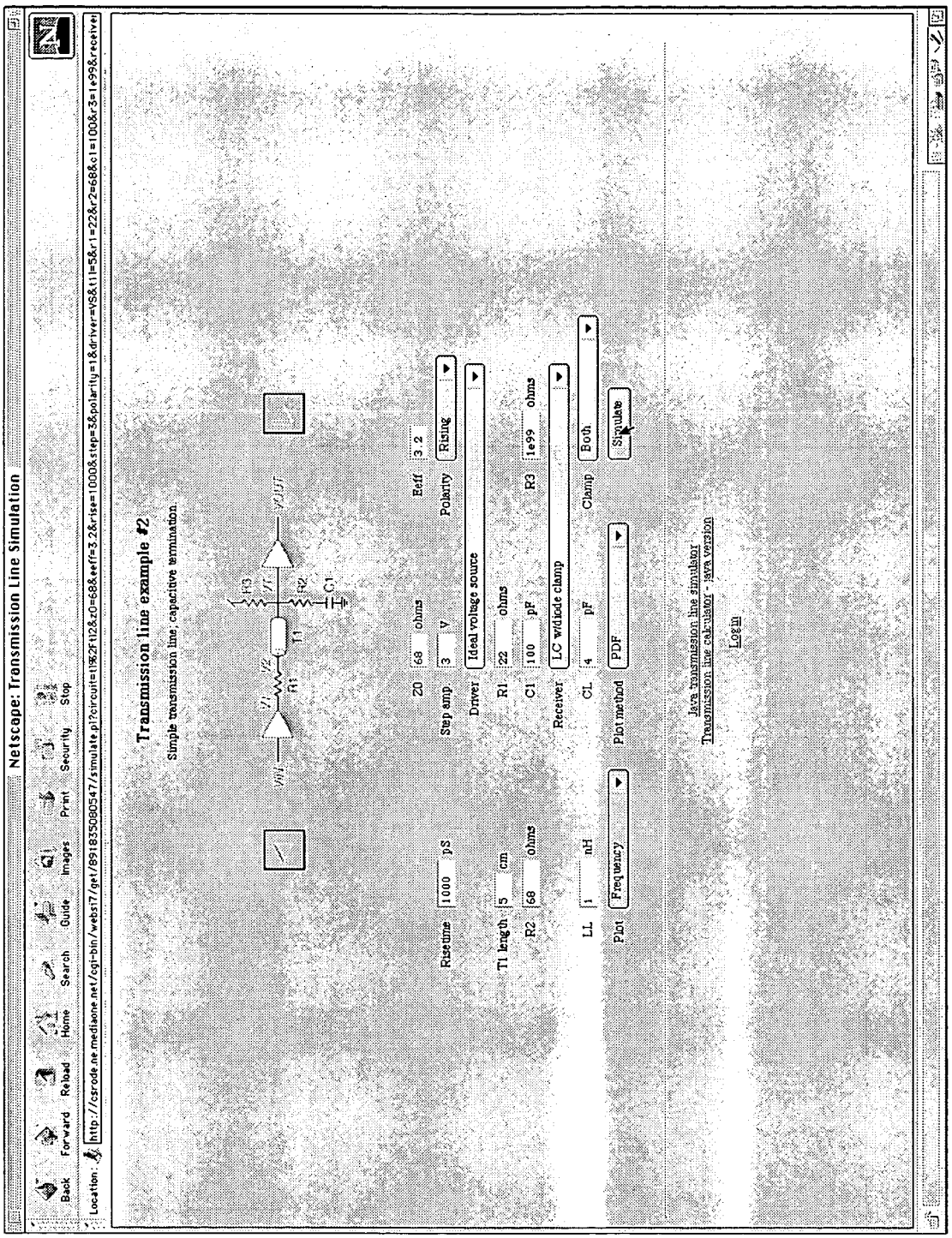
Figure 4H:
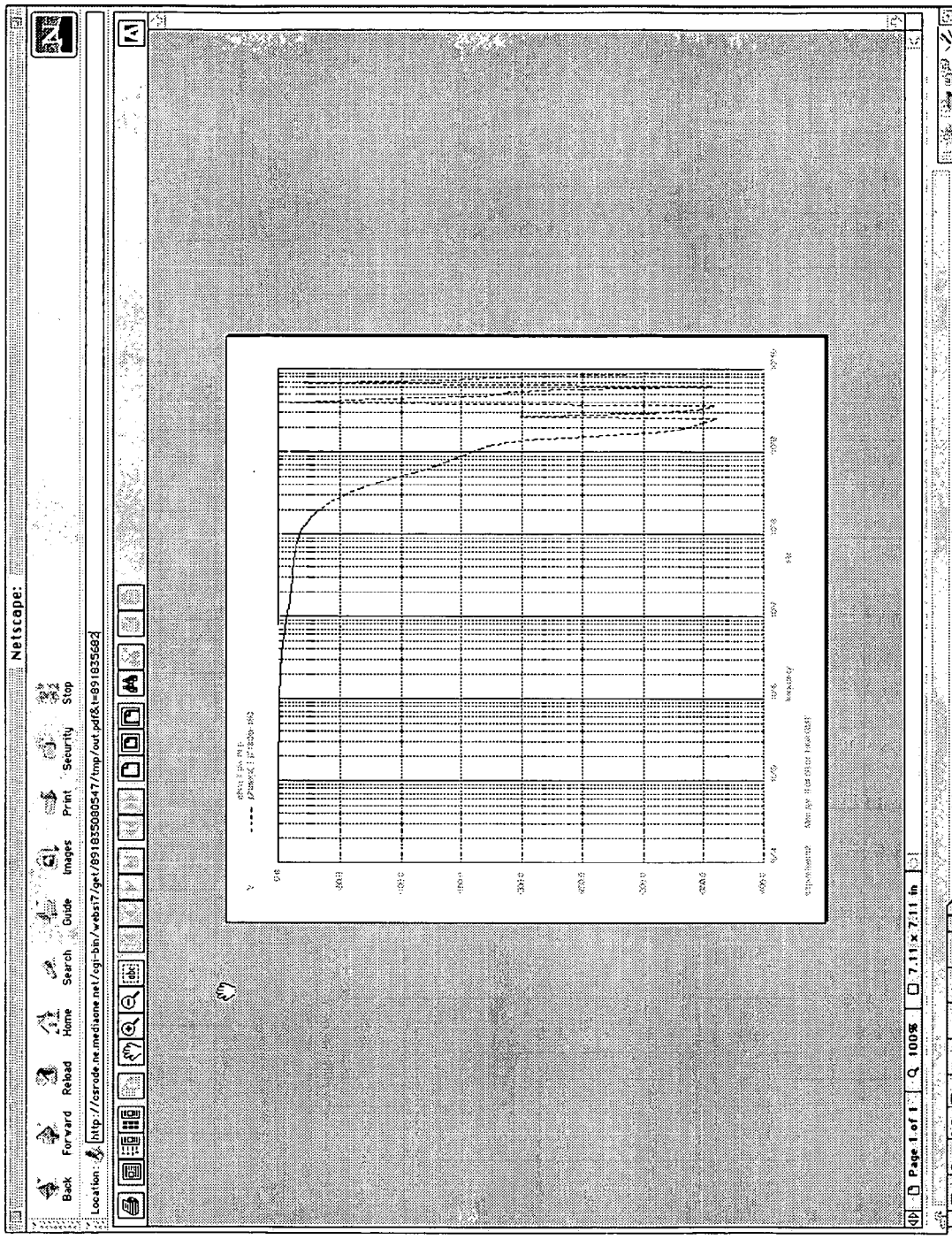
Figure 4I:
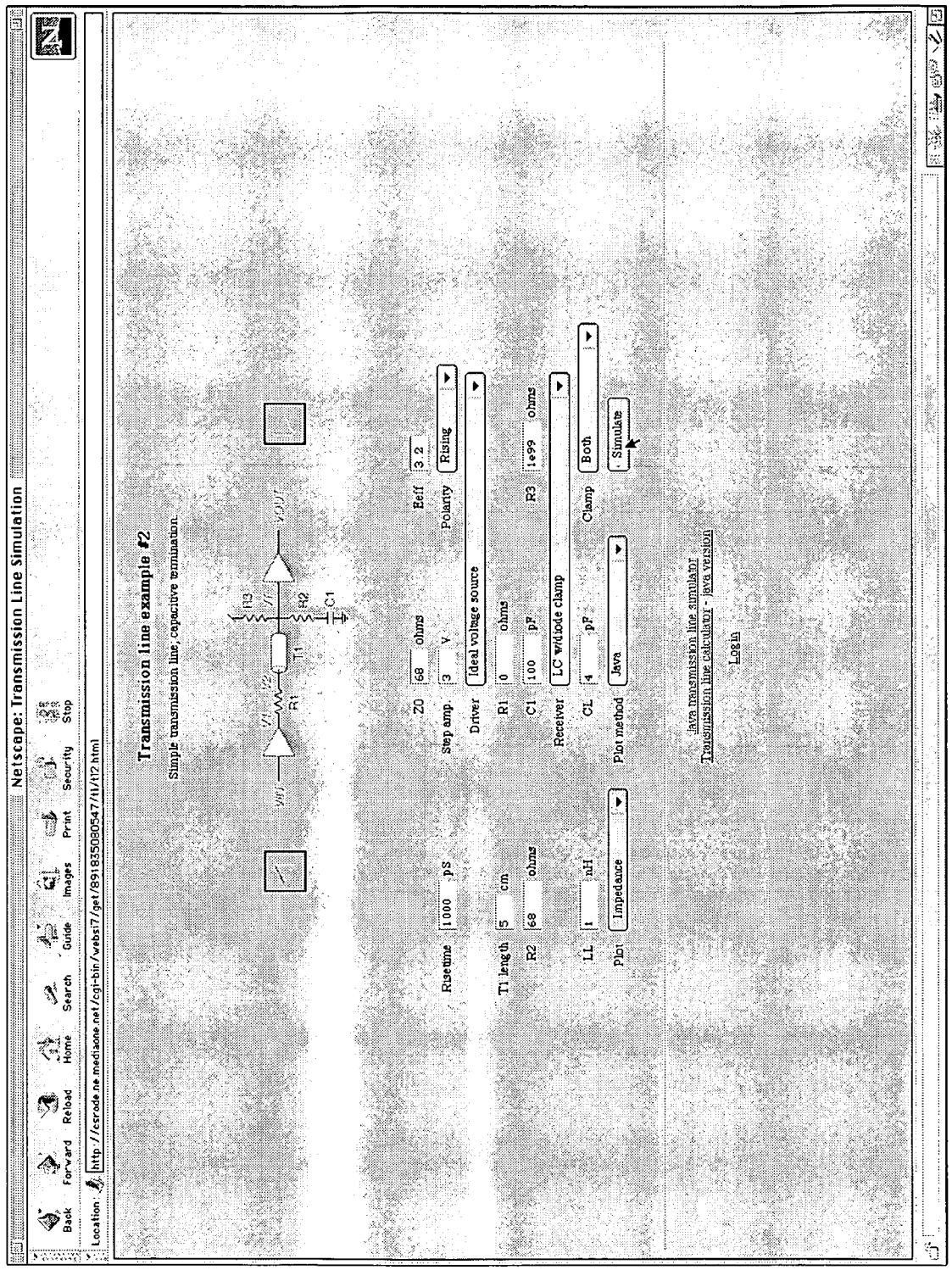
Figure 4J:
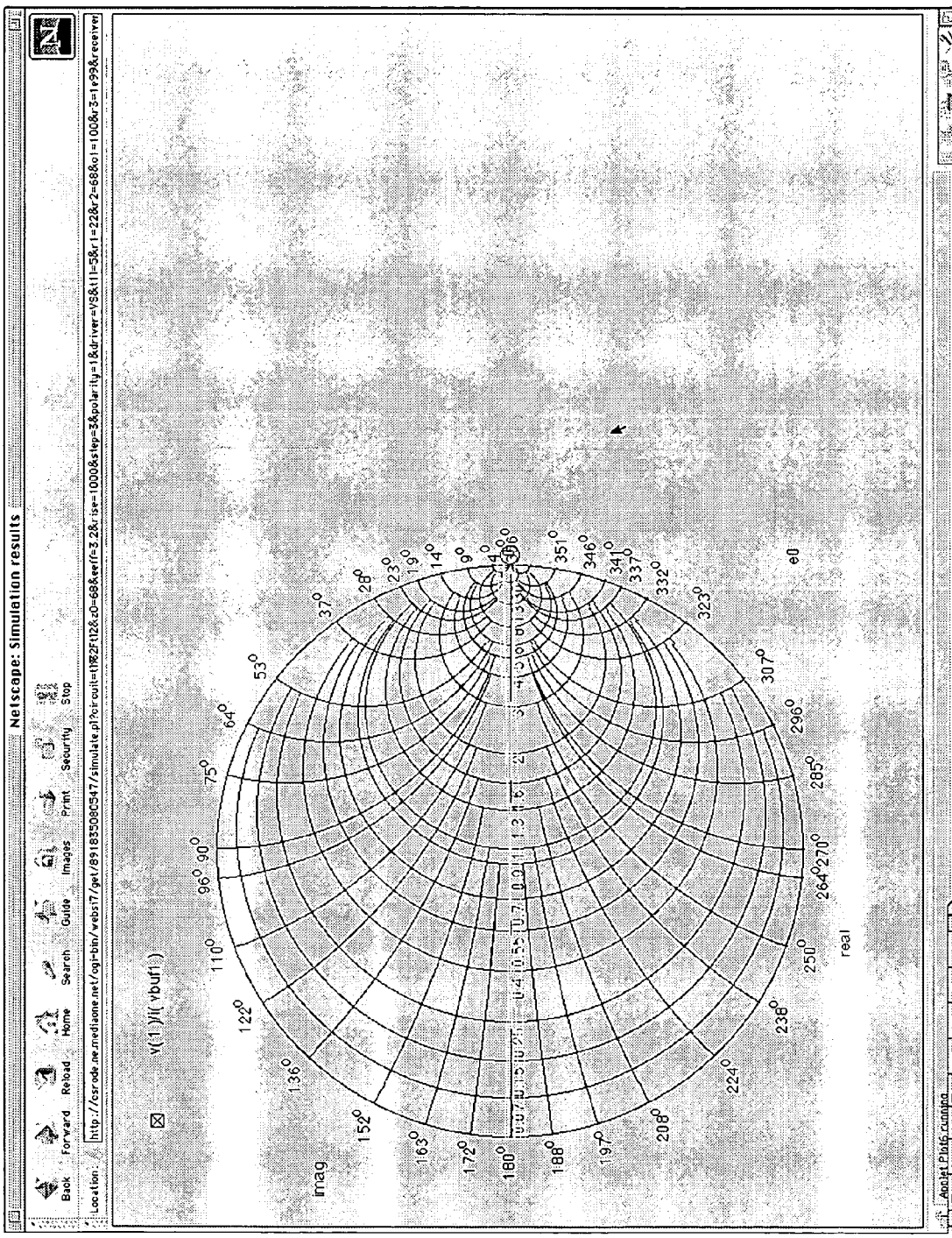
Figure 4K:
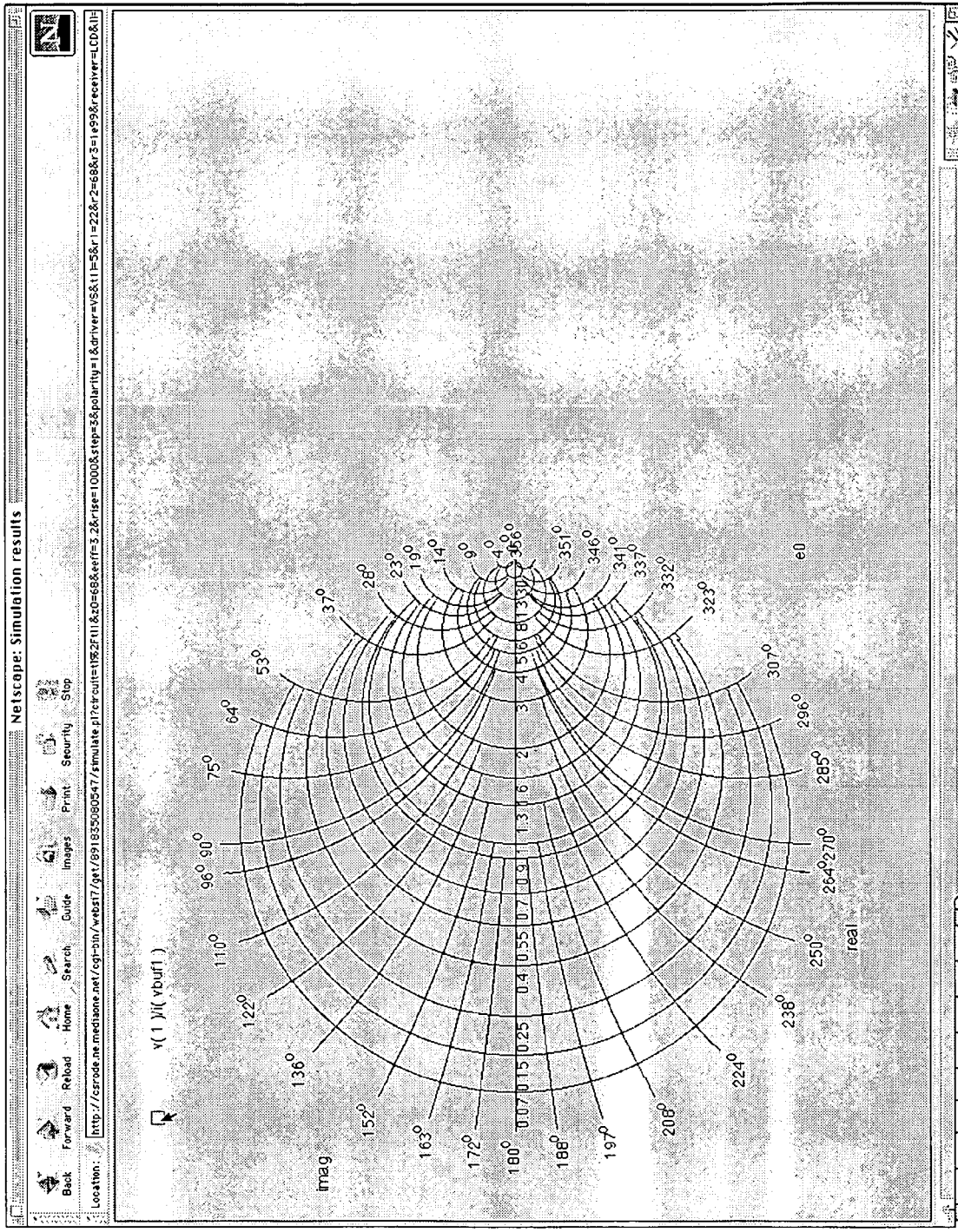

In FIG. 4F a successful transient simulation is shown with the output as a 1024×1024 pixel GIF plot shrunk into a 512× 512 area. By clicking on the GIF image, the entire 1024×1024 plot is displayed. FIGS. 4G and 4H show the simulation process repeated for a frequency plot in Adobe™ Acrobat™ PDF™ format. FIGS. 4I and 4J show the process repeated for a Smith chart impedance plot with the output a Java applet page that draws a display list. A URL reference to a display list is incorporated in the <PARAM>s to the Java applet is separately fetched from the simulation Server and rendered. FIG. 4K shows the ability of this Java applet to show or hide waveforms.

Figure 4L:
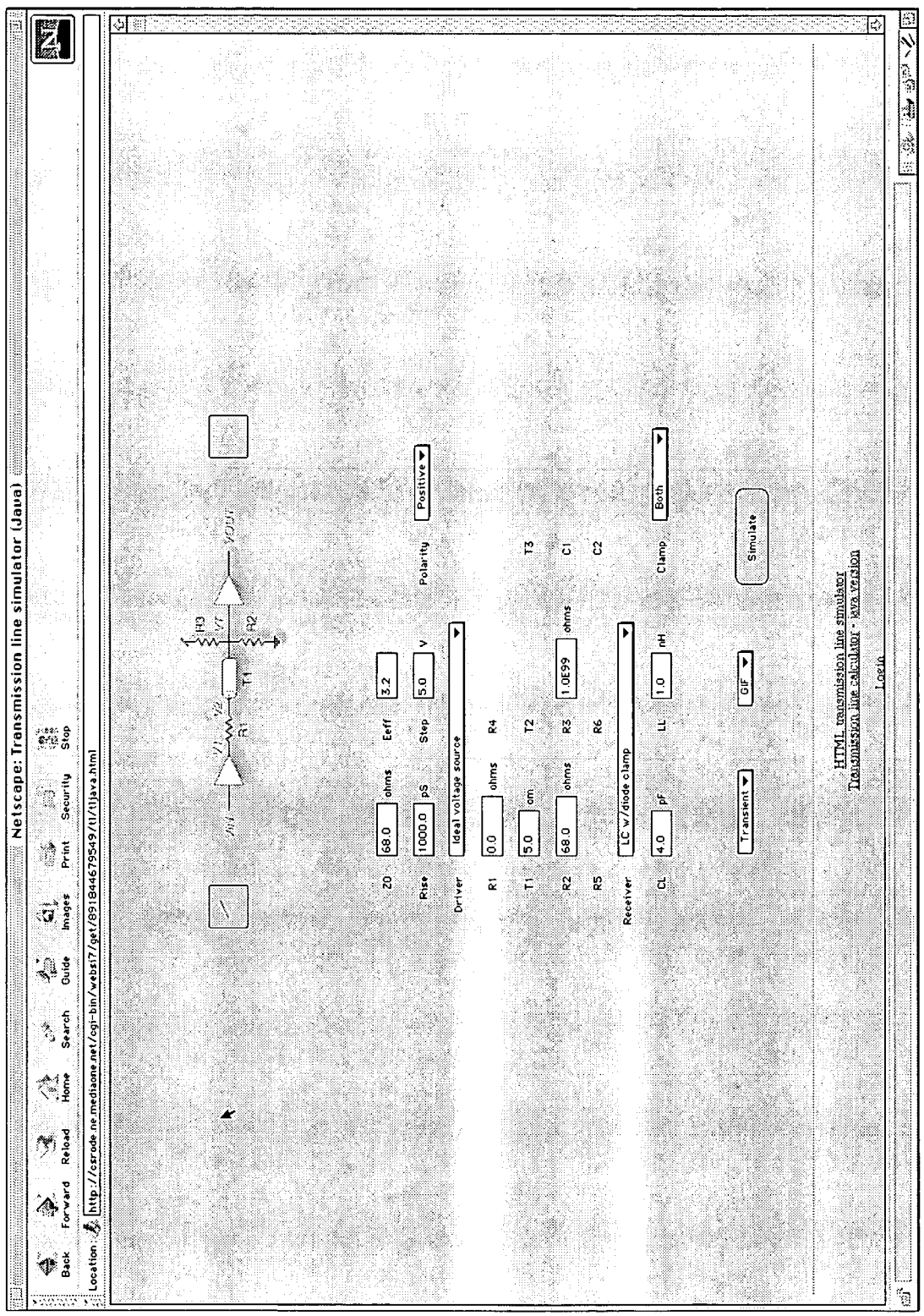

FIG. 4L shows that the HTML interface can be reproduced (and extended) by using Java. Moreover, the HTTP methods used by the simulation servers are available to Java, so the new Server methods are usable by both HTTP and Java interfaces, simultaneously. In this case, however, it's important to note the value of the Unique ID being available in both the PATH-INFO and a cookie, since it is believed to have been experimentally shown that a) Java applets should be given IP addresses for their CODEBASE parameter, so as to avoid a Netscape proxy server incompatibility. b) an IP address and corresponding domain name constitute separate "zones" for cookie data and so said data won't be transmitted for Java submissions to a simulation Server by an IP address.

Figure 5A:
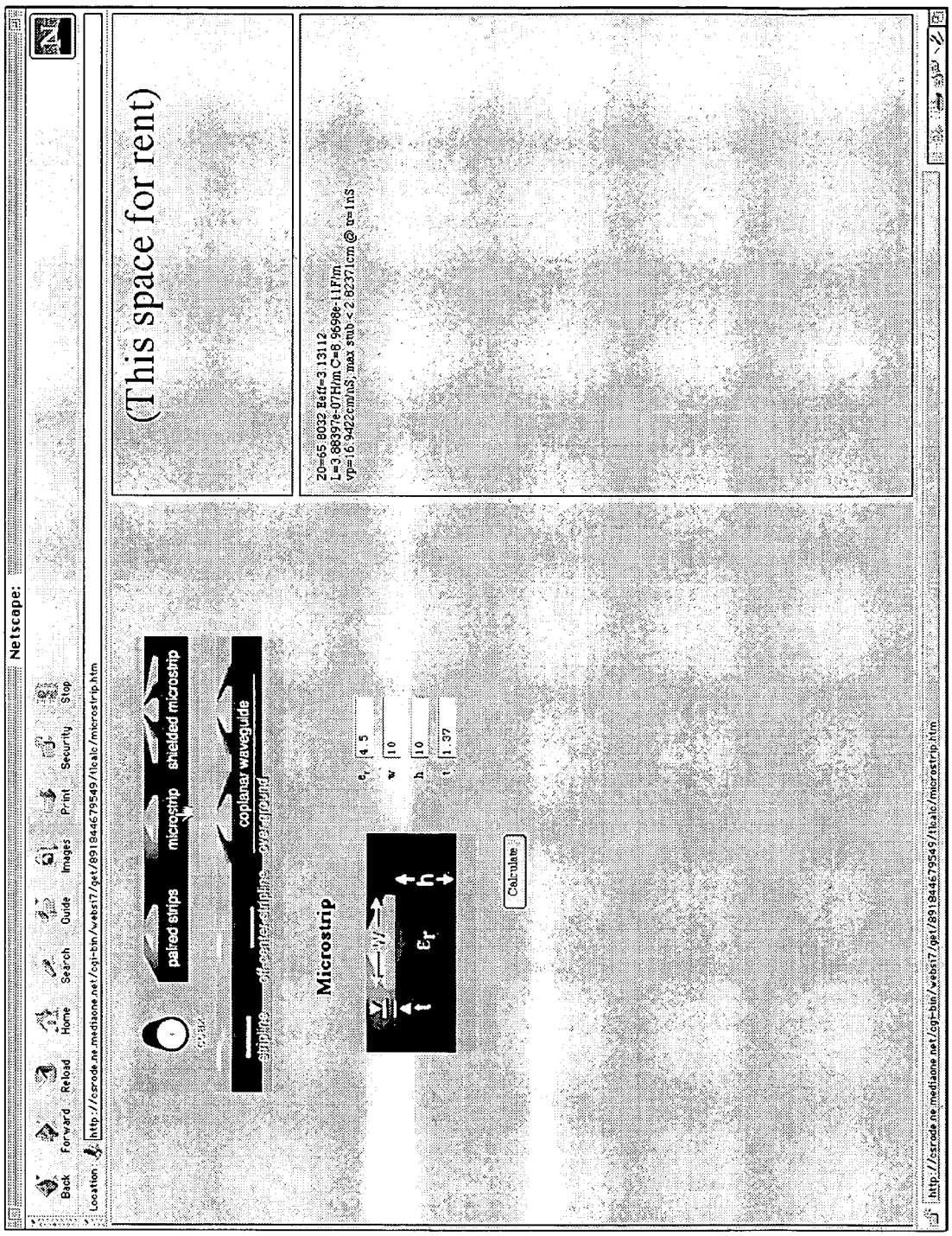
FIG. 5-A Sample User Interface: Calculator assistant for HTML interface (HTML input)
Figure 5B:
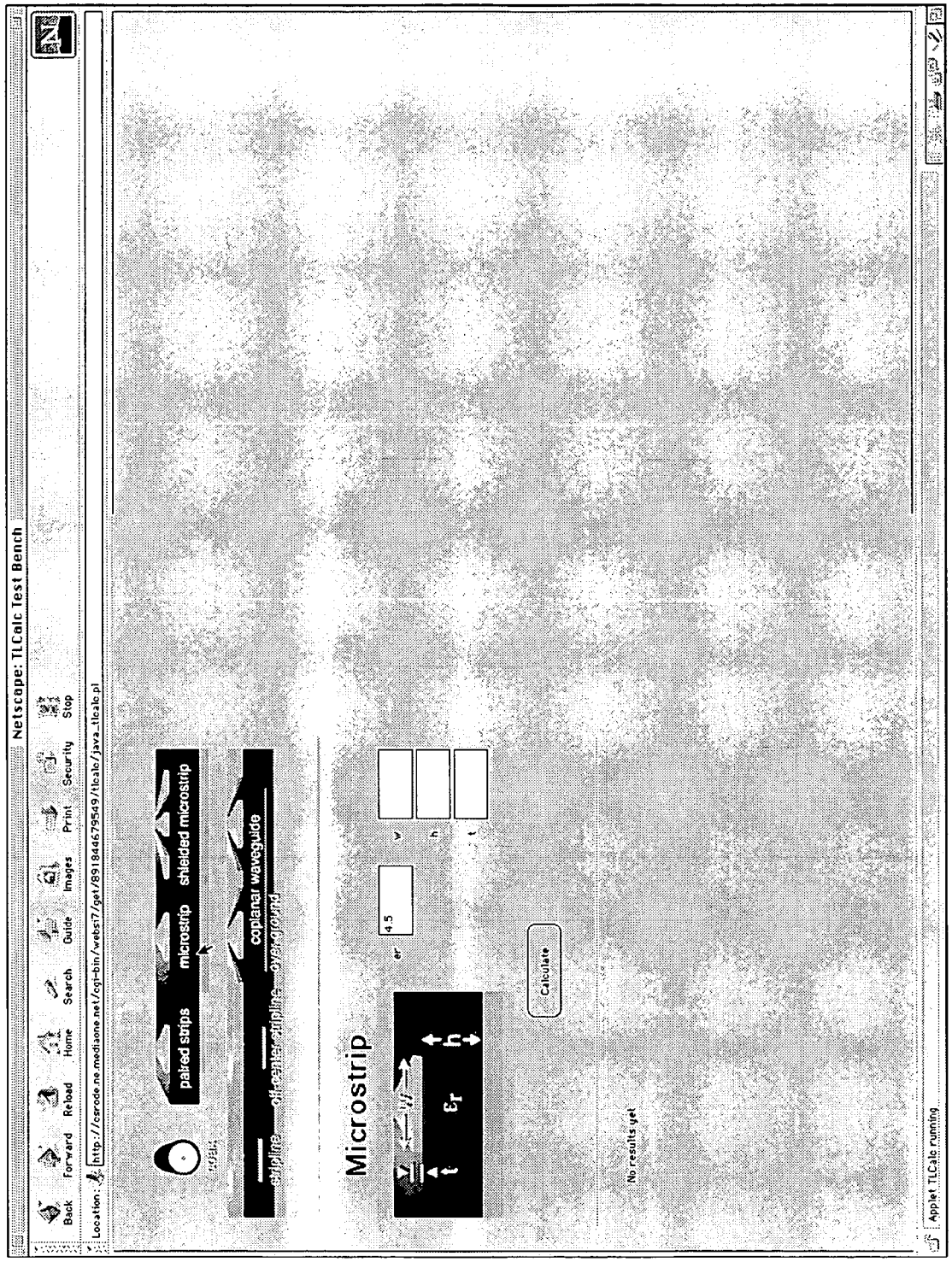

FIGS. 5A and 5B show calculator-type "assistants" or "accessories". In this case they are transmission line parameter calculators that translate physical geometry into more useful parameters. By means of JavaScript it is possible to calculate derived quantities and set those values automatically in the simulation form. Similarly, it is possible for a Java calculator to find and send messages to a Java simulation interface. Some browsers also have the capability to have JavaScript call Java and vice versa.

Figure 6A:
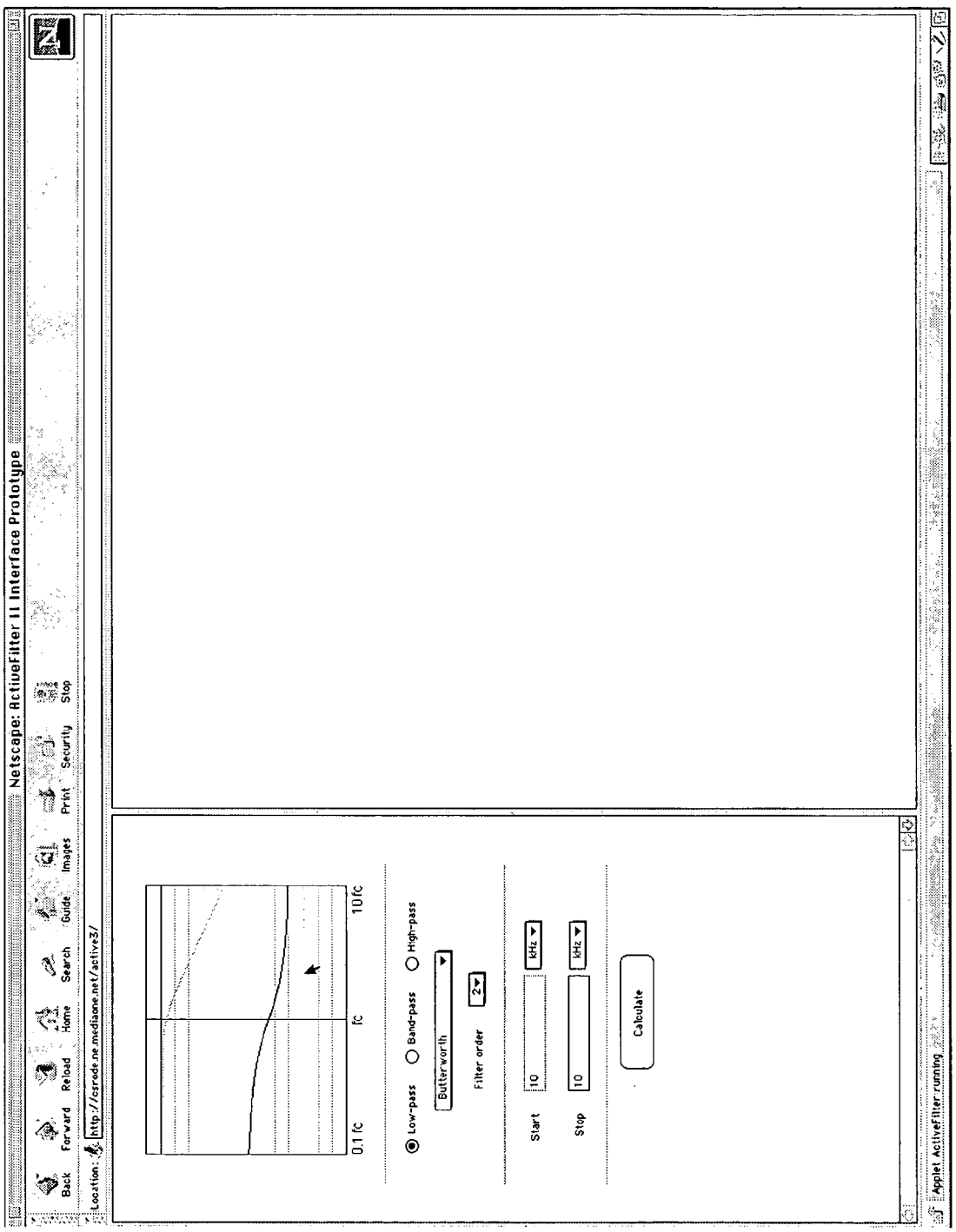
FIG. 6-A User Interface: Circuit Synthesis, Startup (Java input)
Figure 6B:
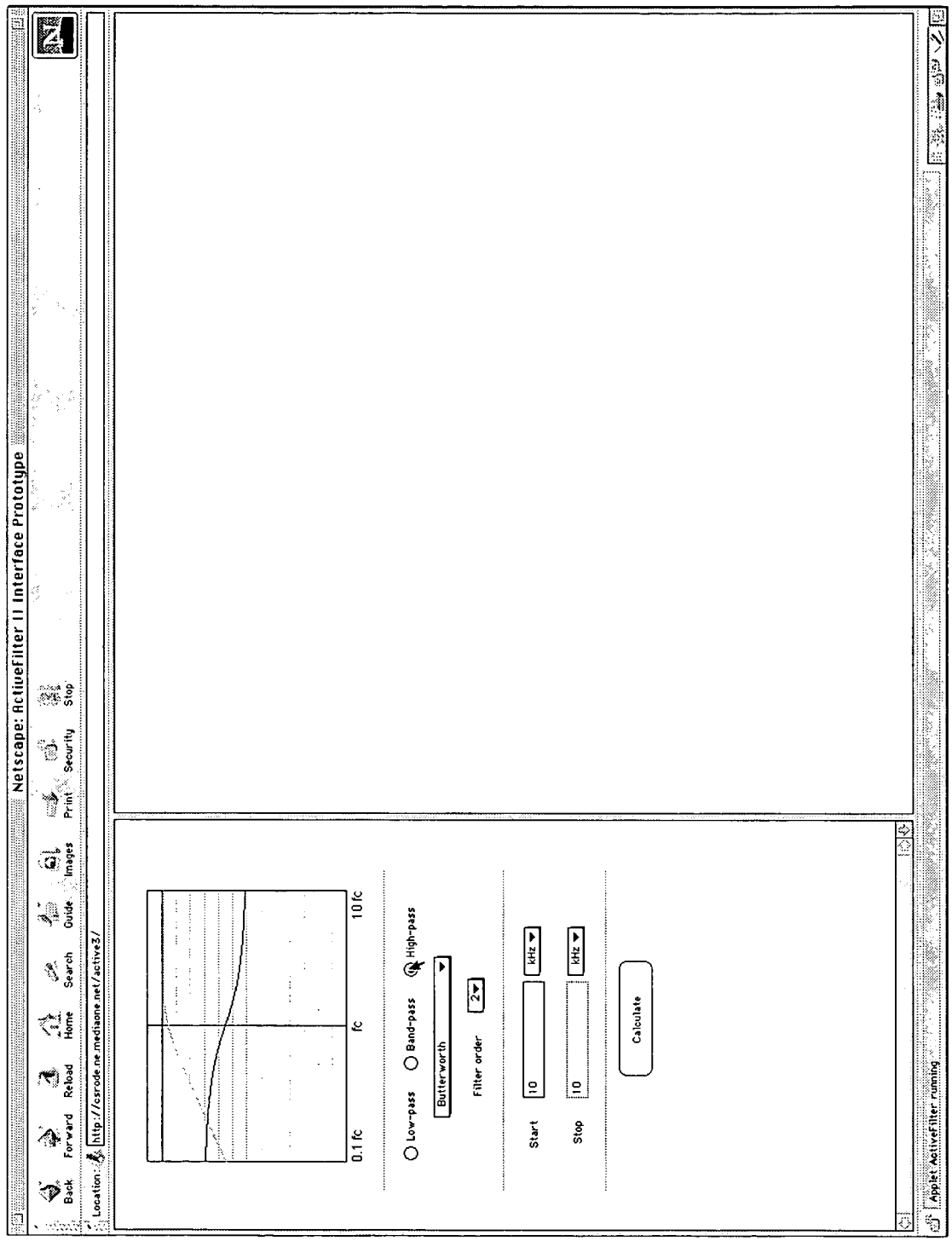
Figure 6C:
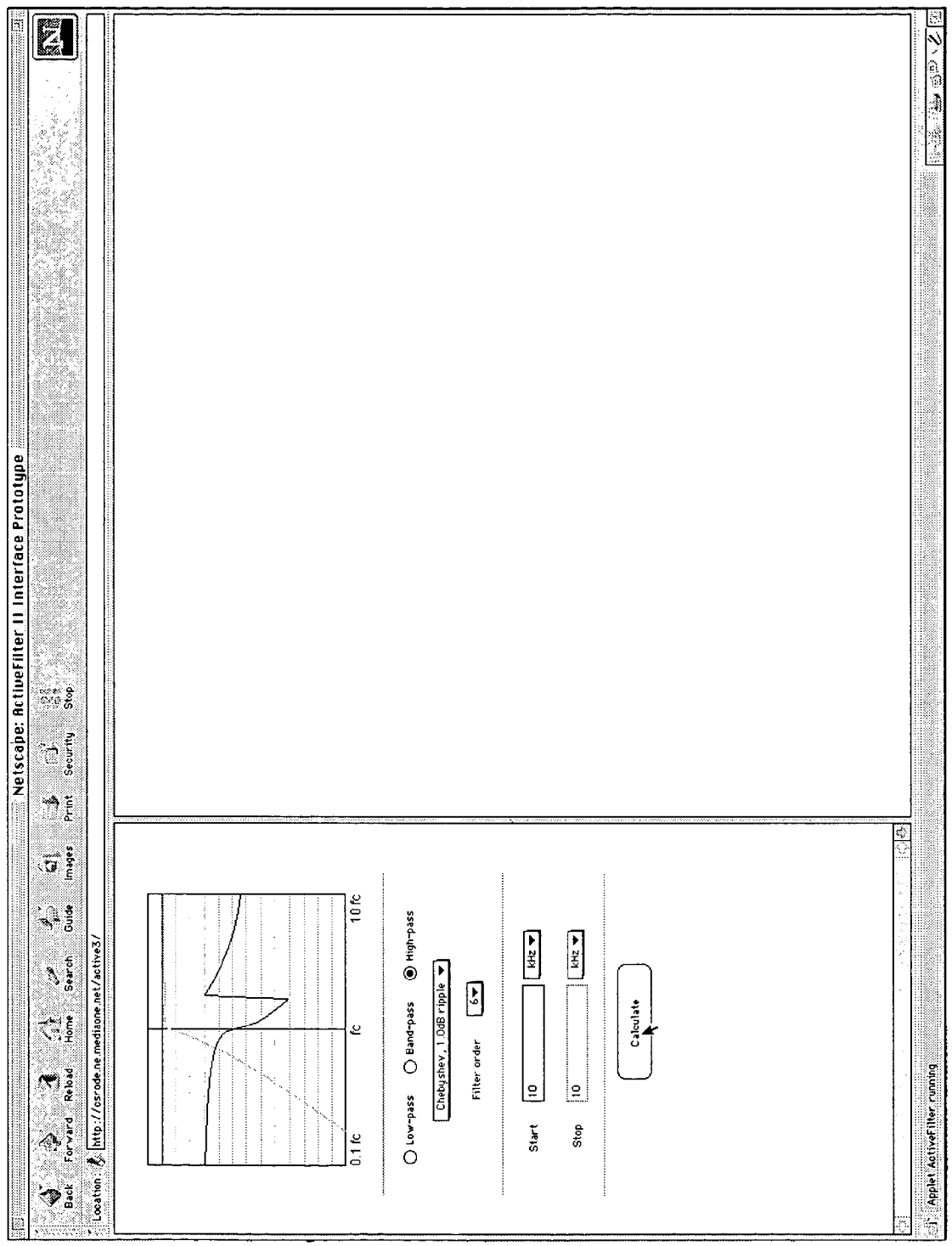
Figure 6D:
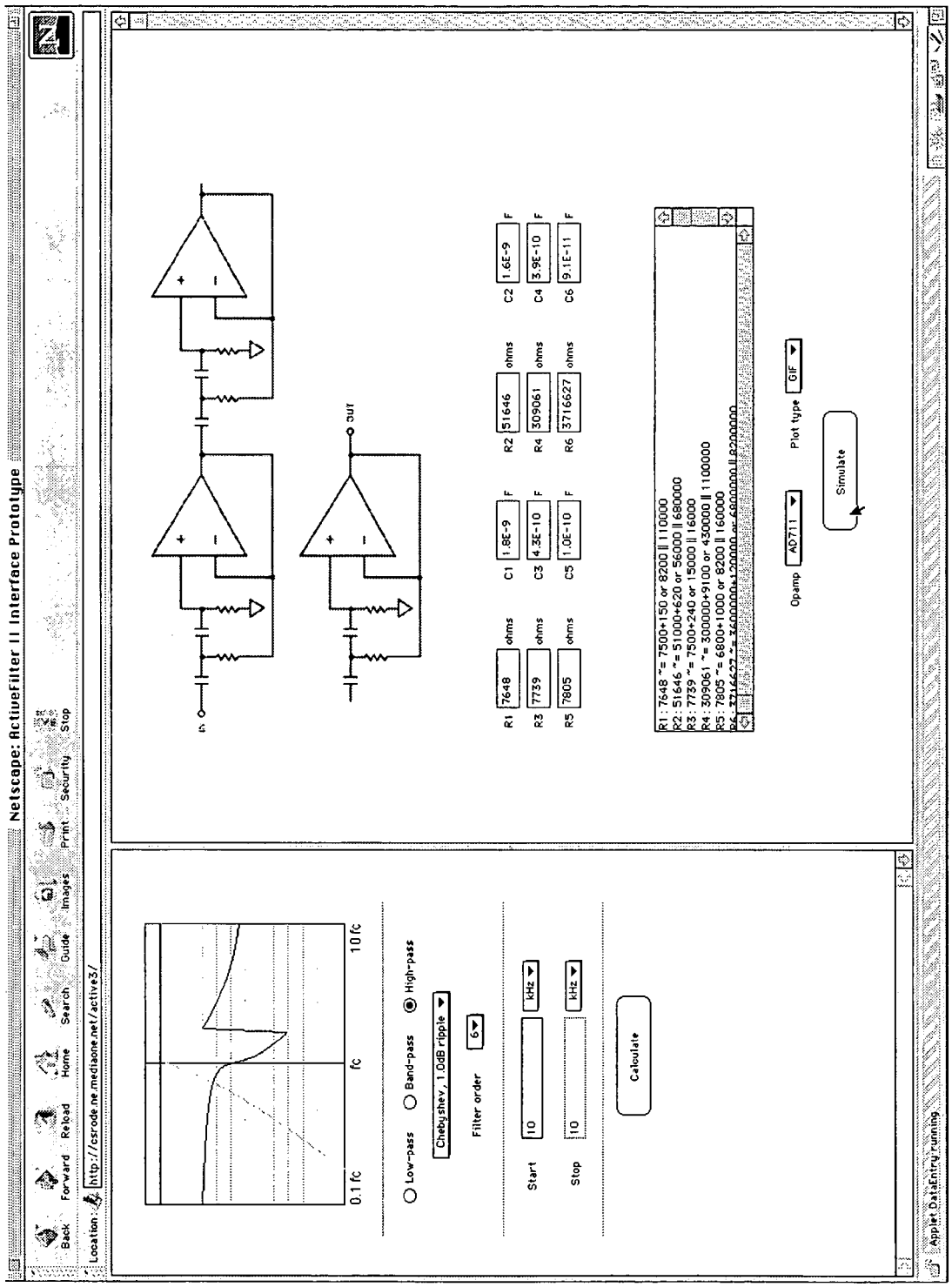
Figure 6E:
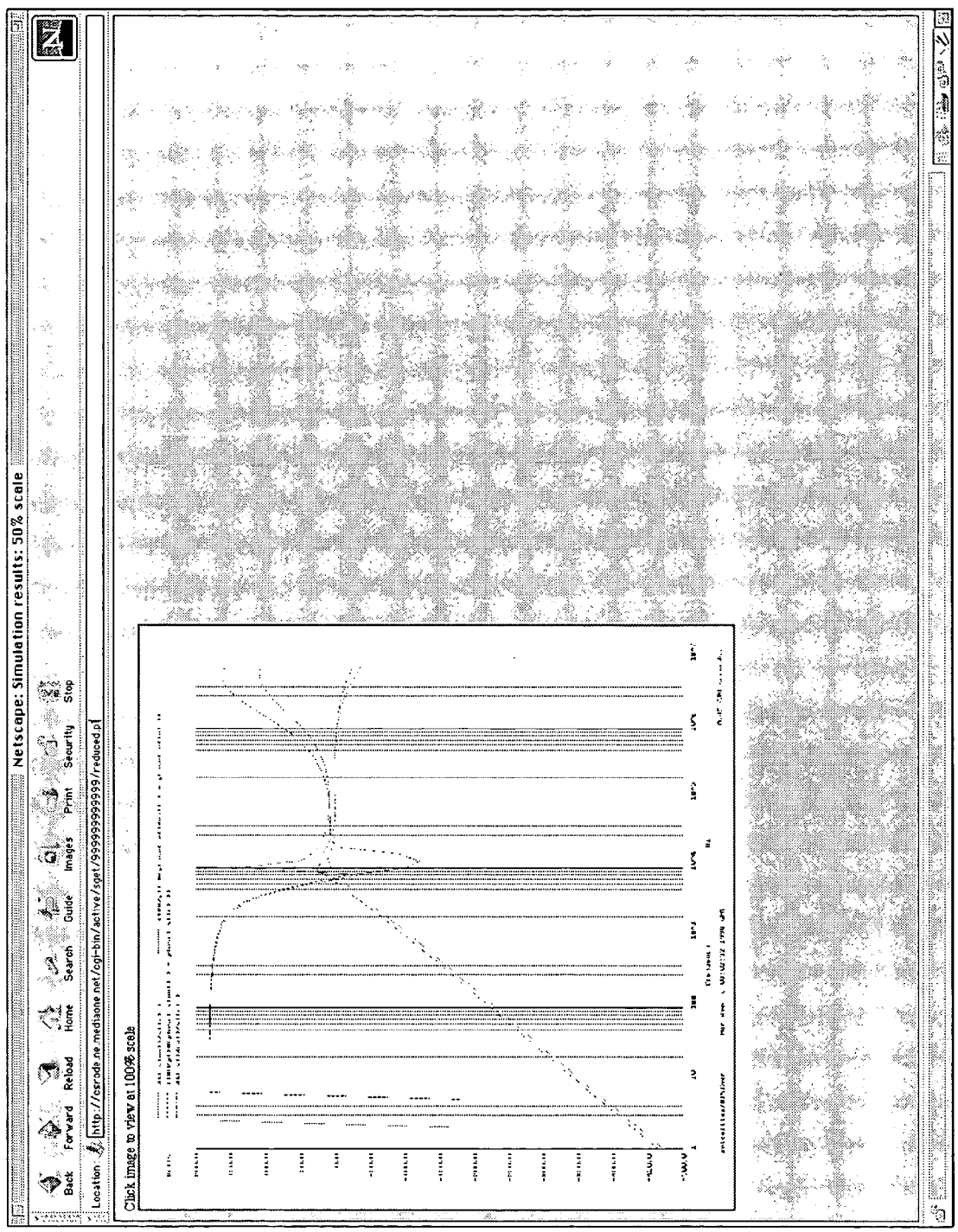
Figure 6F:
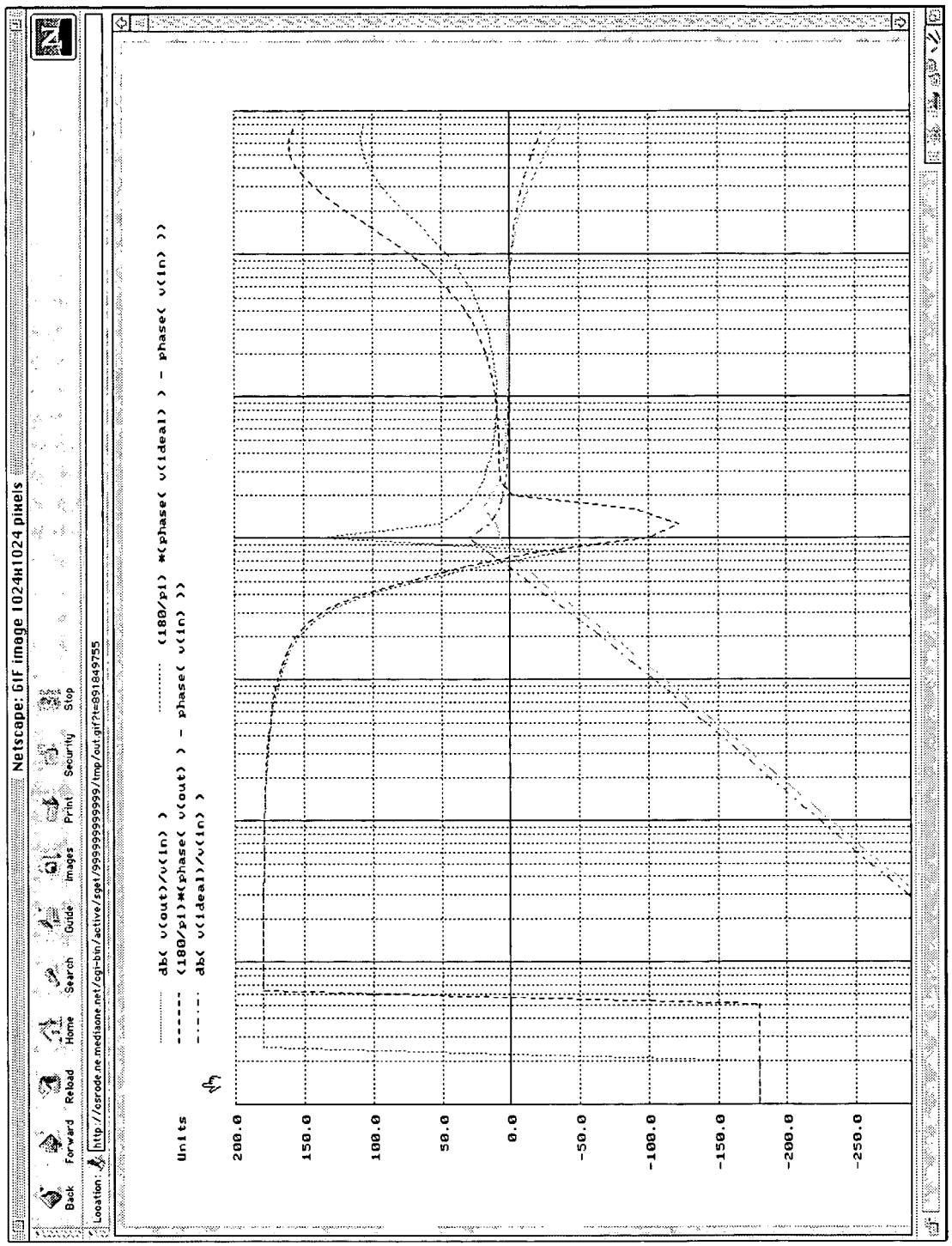

In FIGS. 6A through 6F is presented a synthesis extension to the new Server methods previously discussed. In FIG. 6A a Java interface is presented. In FIG. 6B the synthesis function is selected (high-pass filter). In 6C other parameters have been selected and the "Calculate" button is about to be pressed. When calculate is pressed, the following steps will take place:

a) Form data is submitted to a new set of methods (a new CGI script) which synthesize the topology and component values according to the submitted data.

b) The synthesized topology and component values are converted into schematic graphical data and Form Structure Data. The synthesized Form Structure Data is similar to the generated Form Structure Data of earlier examples, except that said Data contains a new, hidden description of the synthesized circuit, or alternatively a pointer to a temporary circuit template file, synthesized in parallel with the Form Structure Data.

c) The Form Structure Data is returned to the Client. In this embodiment, the data is displayed in a separate HTML frame of the user's Browser.

At this point, the user's options are similar to those earlier when a static circuit was chosen for simulation. Proposed values can be edited and then simulated or directly simulate to confirm correct synthesis. Post synthesis simulation is a powerful tool for checking synthesis accuracy and practicality.

3. Anticipated Extensions

The new simulation methods could be implemented as a "plug-in" to a web server or merged completely with web server methods so as to produce a single software entity of higher performance and less costly to install and maintain.

System synthesis methods could be used to front-end multiple circuit synthesizers, each of these circuit synthesizers distinct and yet similar in broad concept to the filter synthesis module demonstrated. Said system synthesis methods could choose the circuits that would compose a system and then automatically call each of the circuit synthesizers in turn while presenting the user with design options.

There may be other uses and extensions not yet envisioned. Although the examples and discussion are based in electronic circuits, simulators such as SPICE are widely used to simulate mechanical, biological, etc. systems and therefore nothing in this application is intended to limit its scope to purely electronic devices or systems.

Thus the scope of the invention should be determined by the appended claims and their legal equivalents, rather than by the examples given.

What is claimed is:

1. A server simulation method, for use with at least one Client communicating with at least one Server over a Network by means of a Stateless Communications Protocol, said simulation method comprising the steps of:
    a) synthesizing a Unique Identifier and transmitting said Unique Identifier by means of said Stateless Communications Protocol to at least one Client, said Unique Identifier of a data type compatible with proxies for said Stateless Communications Protocol and said Unique Identifier to be used by at least one Server for at least one of the purposes of a) maintaining server state including, but not limited to, separation and management of User data, b) limiting access to or limiting use of server resources, c) tracking server usage or d) server security;
    b) transmitting Form Creation Data to said at least one Client;
    c) accepting User Form Data and said Unique Identifier from said at least one Client;
    d) merging said User Form Data from said at least one Client with other data, including simulation template data;
    e) processing said merged data to produce output data, wherein said output data are functions of a simulation and in a format compatible with said at least one Client display instructions;
    f) transmitting said output data to said at least one Client.

2. The method of claim 1 wherein only steps c-f may be repeated for each new simulation of the same form and wherein only steps b-f may be repeated for each simulation of a new form.

3. The method of claim 2 wherein at least some of said output data is automatically rendered by Client methods for graphical display.

4. The method of claim 1 wherein said Unique Identifier is used to keep the data of each user separate from all other users, with high probability (>99%).

5. The method of claim 4 wherein said user data is stored in temporary files with a limited lifetime.

6. The method of claim 1 wherein the Unique Identifier is made verifiable by means of an internal checksum.

7. The method of claim 1, comprising the following additional steps before processing of said merged data:
    a) retrieving a database record indexed by the Unique Identifier, said database record containing at least an associated simulation usage and timestamp;
    b) creating a new database record when no existing record is found, said new database record indexed by the Unique Identifier and containing at least a simulation usage initialized to zero (0) and a timestamp initialized to the current time;
    c) deleting said retrieved record and backing up at least one step, if said timestamp has become older than a certain threshold;
    d) skipping at least the processing of said merged data, if the simulation usage per unit time has exceeded some threshold;
    e) updating said simulation usage in said database record and saving the updated record in said database.

8. The method of claim 7, wherein the simulation usage is used to lower the process priority of the simulation.

9. The method of claim 1, wherein additional steps related to circuit synthesis are inserted just before step b), such steps comprising:
    aa) transmitting Circuit Synthesis Form Creation Data to said Client;
    ab) accepting Circuit Synthesis Form Data from said Client;
    ac) synthesizing a circuit according to said Circuit Synthesis Form Data, where said synthesized circuit and other temporary files are optionally kept on the Server and indexed by means of the Unique Identifier for eventual use in step 1e);
    ad) creating Form Structure Data for use in step 1b), said Form Structure Data containing circuit topology data.

10. The method of claim 1, wherein said assigned Unique Identifier is associated with superior or inferior privileges, said privileges comprising at least one of a) access to models and circuits, b) simulation priority and/or maximum simulation time, c) quality/accuracy of simulation methods employed, d) the maximum size and/or persistence of design and/or simulation data.

11. The method of claim 1, wherein some portion of the said User Form Data is logged together with at least said Unique Identifier for marketing, sales or debugging purposes. Suitable storage mechanisms for said logged data include, but are not limited to: a) HTTP log file (if HTTP GET mechanism used to initiate simulation), b) file of a type and format determined by the simulation software or c) database record.

12. The method of claim 1, wherein said Unique Identifier is created and transmitted contingent upon the user qualifying for access by successfully conveying appropriate qualification data from the Client to the Server.

13. The method of claim 12, wherein said assigned Unique Identifier is saved on the Client (e.g., a "Cookie") to permit a simulation or synthesis session to be suspended and resumed at a later time without requiring the user to re-qualify for access.

14. The method of claim 1 with the additional ability to execute a plurality of simulation method steps c-f from a single Client concurrently, said plurality being reduced to a single simulation method by aborting all but the method steps corresponding to the last submitted Client User Form Data.

15. An interactive network simulation method, for use with at least one Client communicating with at least one Server over a Network by means of a Stateless Communications Protocol, said method comprising:

synthesizing a Unique Identifier and transmitting said Unique Identifier by means of said Stateless Communications Protocol from a Server to a Client, said Unique Identifier of a data type compatible with proxies for said Stateless Communications Protocol;

transmitting Form Creation Data from a Server to said Client;

transmitting Schematic data from a Server to said Client;

displaying a Form as described by said Form Creation Data and rendering an associated Schematic as described by said Schematic Data by display methods of said Client;

merging of User Form Data from said Client with other data, including simulation template data;

processing by a Server of said merged data to produce at least graphical output data, wherein said graphical output data are functions of a simulation and in a format compatible with said Client's display instructions;

transmitting at least said graphical output data to said Client.

16. A server simulation method, for use with at least one Client communicating with at least one Server over a Network by means of a Stateless Communications Protocol, said simulation method comprising the steps of:

a) synthesizing a Unique Identifier and transmitting said Unique Identifier by means of said Stateless Communications Protocol to at least one Client, said Unique Identifier of a data type compatible with proxies for said Stateless Communications Protocol;

b) transmitting Form Structure Data to said at least one Client;

c) accepting User Form Data and said Unique Identifier from said at least one Client;

d) merging said User Form Data from said at least one Client with other data, including template data;

e) processing said merged data to produce output data, wherein said output data are functions of a simulation and in a format compatible with said at least one Client Browser instructions;

f) while processing said merged data to produce output data, simultaneously capable of accepting and processing new User Form Data from said at least one Client, reception of said new User Form Data with identical Unique Identifier causing present execution of simulation method to be aborted and associated resources freed in favor of processing of said new User Form Data;

g) transmitting said output data to said at least one Client.

* * * * *